(12) United States Patent
Inoue et al.

(10) Patent No.: US 8,599,345 B2
(45) Date of Patent: Dec. 3, 2013

(54) LIQUID CRYSTAL DISPLAY DEVICE

(75) Inventors: Iichiro Inoue, Osaka (JP); Shinichi Terashita, Osaka (JP); Koichi Miyachi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 108 days.

(21) Appl. No.: 13/264,851

(22) PCT Filed: Apr. 12, 2010

(86) PCT No.: PCT/JP2010/002645
§ 371 (c)(1),
(2), (4) Date: Oct. 17, 2011

(87) PCT Pub. No.: WO2010/119659
PCT Pub. Date: Oct. 21, 2010

(65) Prior Publication Data
US 2012/0033159 A1 Feb. 9, 2012

(30) Foreign Application Priority Data

Apr. 17, 2009 (JP) .................................. 2009-101316

(51) Int. Cl.
*G02F 1/1337* (2006.01)
(52) U.S. Cl.
USPC .......................................... 349/129; 349/130
(58) Field of Classification Search
USPC ................................................ 349/129–130
See application file for complete search history.

(56) References Cited

U.S. PATENT DOCUMENTS

| 6,369,870 B1 | 4/2002 | Koma |
| 6,567,144 B1 | 5/2003 | Kim et al. |

(Continued)

FOREIGN PATENT DOCUMENTS

| JP | 8-15678 | 1/1996 |
| JP | 9-281497 | 10/1997 |

(Continued)

OTHER PUBLICATIONS

U.S. Appl. No. 13/264,801, filed Oct. 17, 2011, entitled "Liquid Crystal Display Device".

(Continued)

*Primary Examiner* — James Dudek
(74) *Attorney, Agent, or Firm* — Nixon & Vanderhye P.C.

(57) ABSTRACT

VA-mode liquid crystal display device having a high display quality is provided. A liquid crystal display device according to the present invention includes a vertical alignment type liquid crystal layer; a first substrate and a second substrate facing each other with the liquid crystal layer interposed therebetween; a first electrode provided in the first substrate on the liquid crystal layer side and a second electrode provided in the second substrate on the liquid crystal layer side; and a first alignment film provided between the first electrode and the liquid crystal layer and a second alignment film provided between the second electrode and the liquid crystal layer. The liquid crystal display device includes a plurality of pixel areas located in a matrix. Each of the plurality of pixel areas includes a first liquid crystal domain in which a tilt direction of liquid crystal molecules at the center and in the vicinity thereof in a layer plane and in a thickness direction of the liquid crystal layer when a voltage is applied between the first electrode and the second electrode is a predetermined first direction, a second liquid crystal domain in which such a tilt direction is a predetermined second direction, a third liquid crystal domain in which such a tilt direction is a predetermined third direction and a fourth liquid crystal domain in which such a tilt direction is a predetermined fourth direction; and a difference between any two among the first direction, the second direction, the third direction and the fourth direction is approximately equal to an integral multiple of 90°.

14 Claims, 17 Drawing Sheets

(56) References Cited

U.S. PATENT DOCUMENTS

| | | |
|---|---|---|
| 6,583,835 B1 | 6/2003 | Yoshida et al. |
| 7,113,241 B2 | 9/2006 | Hanaoka |
| 7,136,140 B1 | 11/2006 | Inoue et al. |
| 2004/0119924 A1 | 6/2004 | Takeda et al. |
| 2005/0200789 A1 | 9/2005 | Nakanishi |
| 2006/0139542 A1 | 6/2006 | Ando et al. |
| 2012/0033158 A1 | 2/2012 | Nakanishi et al. |

FOREIGN PATENT DOCUMENTS

| | | |
|---|---|---|
| JP | 11-242225 | 9/1999 |
| JP | 2001-108994 | 4/2001 |
| JP | 2002-98967 | 4/2002 |
| JP | 2004-163746 | 6/2004 |
| JP | 2005-258194 | 9/2005 |
| JP | 2006-184335 | 7/2006 |
| JP | 2008-145700 | 6/2008 |

OTHER PUBLICATIONS

International Preliminary Report on Patentability mailed Nov. 24, 2011 in corresponding PCT Application No. PCT/JP2010/002646.

International Search Report for PCT/JP2010/002646, mailed May 25, 2010.

International Preliminary Report on Patentability mailed Nov. 24, 2011 in corresponding PCT Application No. PCT/JP2010/002645.

International Search Report for PCT/JP2010/002645 mailed May 25, 2010.

Office Action issue in U.S. Appl. No. 13/264,801 dated Apr. 2, 2013.

(a) TFT SUBSTRATE SIDE (b) CF SUBSTRATE SIDE (c) LIQUID CRYSTAL LAYER (a) TFT SUBSTRATE SIDE (b) CF SUBSTRATE SIDE (c) LIQUID CRYSTAL LAYER (a) TFT SUBSTRATE SIDE (b) CF SUBSTRATE SIDE (c) LIQUID CRYSTAL LAYER

LIQUID CRYSTAL DISPLAY DEVICE

This application is the U.S. national phase of International Application No. PCT/JP2010/002645 filed 12 Apr. 2010 which designated the U.S. and claims priority to JP 2009-101316 filed 17 Apr. 2009, the entire contents of each of which are hereby incorporated by reference.

TECHNICAL FIELD

The present invention relates to a liquid crystal display device, and specifically a liquid crystal display device having wide viewing angle characteristics.

BACKGROUND ART

Liquid crystal display devices have been improved in terms of display characteristics, and are now used for TV receivers and the like more and more widely. The viewing angle characteristics of the liquid crystal display devices have been improved but are desired to be further improved. Especially, the viewing angle characteristics of liquid crystal display devices using a vertical alignment type liquid crystal layer (also referred to as the "VA-mode liquid crystal display devices") are strongly desired to be improved.

VA-mode liquid crystal display devices currently used for large display devices of TVs and the like adopt a multi-domain structure in which a plurality of liquid crystal domains are formed in one pixel in order to improve the viewing angle characteristics. A mainly used method for forming the multi-domain structure is an MVA mode. The MVA mode is disclosed in, for example, Patent Document 1.

According to the MVA mode, a pair of substrates facing each other with a vertical alignment type liquid crystal layer interposed therebetween each include an alignment regulation structure on a surface thereof on the liquid crystal layer side. Owing to such alignment regulation structures, a plurality of domains having different alignment directions (tilt directions) of liquid crystal molecules (typically, there are four types of alignment directions) are formed in each pixel area. As the alignment regulation structures, slits (openings) or ribs (protrusion structures) provided in or on electrodes are used, and an alignment regulation force is exerted from both sides of the liquid crystal layer.

However, in the case where the slits or ribs are used, unlike in the case where the pretilt directions are defined by alignment films used in the conventional TN mode, the alignment regulation force on the liquid crystal molecules is nonuniform in the pixel area because the slits and ribs are linear. This causes a problem that, for example, there occurs a response speed distribution. There is another problem that since the light transmittance of an area where the slits or ribs are provided is lowered, the display luminance is decreased.

CITATION LIST

Patent Literature

Patent Document 1: Japanese Laid-Open Patent Publication No. 11-242225

SUMMARY OF INVENTION

Technical Problem

In order to avoid the above-described problems, it is preferable that even in a VA-mode liquid crystal display device, the multi-domain structure is formed by defining the pretilt direction by means of alignment films. However, as a result of various studies, the present inventors found that when the multi-domain structure is formed by such a method, alignment disturbance unique to VA-mode liquid crystal display devices occurs and the display quality is lowered. Specifically, in the vicinity of an edge of a pixel electrode, an area darker than the remaining area (dark line) appears parallel to the edge, and this lowers the transmittance.

The present invention made in light of these problems has an object of providing a VA-mode liquid crystal display device having a high display quality.

Solution to Problem

A liquid crystal display device according to the present invention includes a vertical alignment type liquid crystal layer; a first substrate and a second substrate facing each other with the liquid crystal layer interposed therebetween; a first electrode provided in the first substrate on the liquid crystal layer side and a second electrode provided in the second substrate on the liquid crystal layer side; and a first alignment film provided between the first electrode and the liquid crystal layer and a second alignment film provided between the second electrode and the liquid crystal layer. The liquid crystal display device includes a plurality of pixel areas located in a matrix; each of the plurality of pixel areas includes a first liquid crystal domain in which a tilt direction of liquid crystal molecules at the center and in the vicinity thereof in a layer plane and in a thickness direction of the liquid crystal layer when a voltage is applied between the first electrode and the second electrode is a predetermined first direction, a second liquid crystal domain in which such a tilt direction is a predetermined second direction, a third liquid crystal domain in which such a tilt direction is a predetermined third direction and a fourth liquid crystal domain in which such a tilt direction is a predetermined fourth direction; a difference between any two among the first direction, the second direction, the third direction and the fourth direction is approximately equal to an integral multiple of 90°; the first liquid crystal domain is close to at least a part of edges of the first electrode, and the at least a part includes a first edge portion, wherein an azimuthal angle direction perpendicular to the first edge portion and directed to the inside of the first electrode has an angle exceeding 90° with respect to the first direction; and the second substrate includes a first rib provided in an area corresponding to the first edge portion.

In a preferable embodiment, the second liquid crystal domain is close to at least a part of the edges of the first electrode, and the at least a part includes a second edge portion, wherein an azimuthal angle direction perpendicular to the second edge portion and directed to the inside of the first electrode has an angle exceeding 90° with respect to the second direction; the third liquid crystal domain is close to at least a part of the edges of the first electrode, and the at least a part includes a third edge portion, wherein an azimuthal angle direction perpendicular to the third edge portion and directed to the inside of the first electrode has an angle exceeding 90° with respect to the third direction; the fourth liquid crystal domain is close to at least a part of the edges of the first electrode, and the at least a part includes a fourth edge portion, wherein an azimuthal angle direction perpendicular to the fourth edge portion and directed to the inside of the first electrode has an angle exceeding 90° with respect to the fourth direction; and the second substrate includes a second rib provided in an area corresponding to the second edge portion, a third rib provided in an area corresponding to the third edge portion, and a fourth rib provided in an area corresponding to the fourth edge portion.

In a preferable embodiment, where an azimuthal angle of a horizontal direction of a display plane is 0°, the first direction is a direction of about 225°, the second direction is a direction of about 315°, the third direction is a direction of about 45°, and the fourth direction is a direction of about 135°; and the first edge portion and the third edge portion are generally parallel to a vertical direction of the display plane, and the second edge portion and the fourth edge portion are generally parallel to the horizontal direction of the display plane.

In a preferable embodiment, the first substrate includes a gate bus line extending generally parallel to the horizontal direction of the display plane, and a source bus line extending generally parallel to the vertical direction of the display plane; and as seen from a frontal direction, a shift S1 (μm) of the center of the first rib in a width direction from the first edge portion, a shift S2 (μm) of the center of the second rib in the width direction from the second edge portion, a shift S3 (μm) of the center of the third rib in the width direction from the third edge portion, and a shift S4 (μm) of the center of the fourth rib in the width direction from the fourth edge portion fulfill the relationships of 0≤S1≤4.9, −3.7≤S2≤1.8, 0≤S3≤4.9, and −3.7≤S4≤1.8, where the inner side to the edges of the first electrode is represented by a positive numerical value and the outer side to the edges of the first electrode is represented by a negative numerical value.

In a preferable embodiment, where an azimuthal angle of a horizontal direction of a display plane is 0°, the first direction is a direction of about 225°, the second direction is a direction of about 315°, the third direction is a direction of about 45°, and the fourth direction is a direction of about 135°; and the first edge portion and the third edge portion are generally parallel to the horizontal direction of the display plane, and the second edge portion and the fourth edge portion are generally parallel to a vertical direction of the display plane.

In a preferable embodiment, the first substrate includes a gate bus line extending generally parallel to the horizontal direction of the display plane, and a source bus line extending generally parallel to the vertical direction of the display plane; and as seen from a frontal direction, a shift S1 (μm) of the center of the first rib in a width direction from the first edge portion, a shift S2 (μm) of the center of the second rib in the width direction from the second edge portion, a shift S3 (μm) of the center of the third rib in the width direction from the third edge portion, and a shift S4 (μm) of the center of the fourth rib in the width direction from the fourth edge portion fulfill the relationships of −3.7≤S1≤1.8, 0≤S2≤4.9, −3.7≤S3≤1.8 and 0≤S4≤4.9, where the inner side to the edges of the first electrode is represented by a positive numerical value and the outer side to the edges of the first electrode is represented by a negative numerical value.

In a preferable embodiment, as seen from a frontal direction, the first rib is located such that the center thereof in a width direction substantially overlaps the first edge portion, the second rib is located such that the center thereof in the width direction substantially overlaps the second edge portion, the third rib is located such that the center thereof in the width direction substantially overlaps the third edge portion, and the fourth rib is located such that the center thereof in the width direction substantially overlaps the fourth edge portion.

In a preferable embodiment, the first direction and second direction have an angle of about 180° with respect to each other; the second liquid crystal domain is close to at least a part of the edges of the first electrode, and the at least a part includes a second edge portion, wherein an azimuthal angle direction perpendicular to the second edge portion and directed to the inside of the first electrode has an angle exceeding 90° with respect to the second direction; the second substrate includes a second rib provided in an area corresponding to the second edge portion; the first edge portion and the second edge portion each include a first portion parallel to the horizontal direction, and a second portion parallel to the vertical direction; and the first rib and the second rib each include a first portion parallel to the horizontal direction and a second portion parallel to the vertical direction.

In a preferable embodiment, the first liquid crystal domain, the second liquid crystal domain, the third liquid crystal domain and the fourth liquid crystal domain are each adjacent to the others of the liquid crystal domains and are located in a matrix of 2 rows×2 columns.

In a preferable embodiment, the first liquid crystal domain, the second liquid crystal domain, the third liquid crystal domain and the fourth liquid crystal domain are located such that the tilt directions in adjacent liquid crystal domains among the first through fourth liquid crystal domains are different by 90° from each other.

In a preferable embodiment, the liquid crystal display device according to the present invention further includes a pair of polarizing plates facing each other with the liquid crystal layer interposed therebetween and located such that transmission axes thereof are generally perpendicular to each other. The first direction, the second direction, the third direction and the fourth direction each make an angle of about 45° with respect to the transmission axes of the pair of polarizing plates.

In a preferable embodiment, the liquid crystal layer contains the liquid crystal molecules having a negative dielectric anisotropy; and a pretilt direction defined by the first alignment film and a pretilt direction defined by the second alignment film are different by about 90° from each other.

In a preferable embodiment, a pretilt angle defined by the first alignment film and a pretilt angle defined by the second alignment film are approximately equal to each other.

In a preferable embodiment, the first alignment film and the second alignment film are each an optical alignment film.

Advantageous Effects of Invention

According to the present invention, the display quality of a VA-mode liquid crystal display device, especially, the transmittance thereof can be improved. The present invention can improve the display quality of, especially, a liquid crystal display device in which a multi-domain structure is formed by use of an alignment film.

BRIEF DESCRIPTION OF DRAWINGS

FIG. 4(a) shows the pretilt directions on the side of a TFT substrate, FIG. 4(b) shows the pretilt directions on the side of a CF substrate, and FIG. 4(c) shows the tilt directions and dark lines when a voltage is applied to a liquid crystal layer.

FIG. 5(a) shows the pretilt directions on the side of the TFT substrate, FIG. 5(b) shows the pretilt directions on the side of the CF substrate, and FIG. 5(c) shows the tilt directions and dark lines when a voltage is applied to the liquid crystal layer.

FIG. 19(a) shows the pretilt directions on the side of the TFT substrate, FIG. 19(b) shows the pretilt directions on the side of the CF substrate, and FIG. 19(c) shows the tilt directions and dark lines when a voltage is applied to the liquid crystal layer.

FIG. 20(a) shows the pretilt directions on the side of the TFT substrate, FIG. 20(b) shows the pretilt directions on the side of the CF substrate, and FIG. 20(c) shows the tilt directions and dark lines when a voltage is applied to the liquid crystal layer.

DESCRIPTION OF EMBODIMENTS

Figure 1:
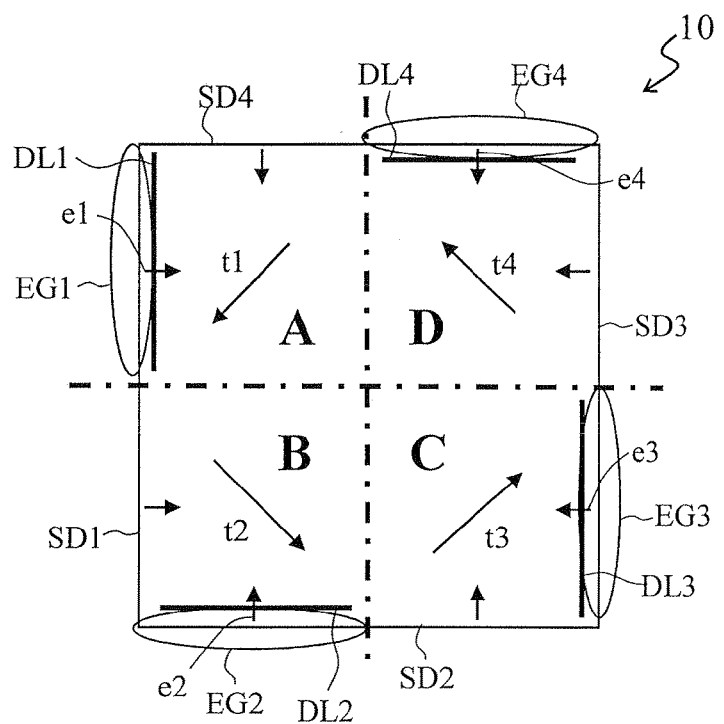
FIG. 1 shows an example of pixel area having a multi-domain structure in a VA-mode liquid crystal display device.

According to the present invention, in a liquid crystal display device including a vertical alignment type liquid crystal layer in which the pretilt direction is defined by alignment films, a rib (protrusion structure) is provided in an area where a dark line appears. The provision of the rib shifts the position of the dark line outward with respect to the position at which the dark line would otherwise appear, and thus improves the transmittance of the pixel area. Provision of the rib at a specific position can effectively improve the transmittance. Hereinafter, embodiments of the present invention will be described. In the following description, a TFT-type liquid crystal display device will be shown as a typical example, but the present invention is applicable to any other driving method of liquid crystal display devices, needless to say.

First, main terms used in this specification will be explained.

In this specification, the term "vertical alignment type liquid crystal layer" refers to a liquid crystal layer in which liquid crystal molecules are aligned at an angle of about 85° or greater with respect to surfaces of the vertical alignment films. The liquid crystal molecules contained in the vertical alignment type liquid crystal layer have a negative dielectric anisotropy. By a combination of the vertical alignment type liquid crystal layer and a pair of polarizing plates facing each other with the liquid crystal layer interposed therebetween and located in crossed Nicols (i.e., located such that transmission axes thereof are generally perpendicular to each other), normally black mode display is provided.

In this specification, the term "pixel" refers to the minimum unit which represents a particular gray scale level in display. In color display, a pixel corresponds to a unit representing, for example, a gray scale level of each of R, G and B, and is also referred to as a "dot". A combination of an R pixel, a G pixel and a B pixel forms one color display pixel. The term "pixel area" refers to an area of the liquid crystal display device which corresponds to the "pixel" for display.

The term "pretilt direction" refers to an alignment direction of a liquid crystal molecule defined by an alignment film and is an azimuthal angle direction in the display plane. An angle of the liquid crystal molecule with respect to the surface of the alignment film when the liquid crystal molecule is aligned in the pretilt direction is referred to as the "pretilt angle". In this specification, performing processing on the alignment film to allow the alignment film to express a capability of defining a prescribed pretilt direction is expressed as "giving a pretilt direction to the alignment film". The pretilt direction defined by the alignment film is occasionally referred to simply as the "pretilt direction of the alignment film". The pretilt direction is given to the alignment film by, for example, rubbing processing or optical alignment processing described later.

By changing the combination of the pretilt directions given by a pair of alignment films facing each other with the liquid crystal layer interposed therebetween, a 4-domain structure can be formed. A pixel area divided into four has four liquid crystal domains.

Each liquid crystal domain is characterized by the tilt direction (also referred to as the "reference alignment direction") of the liquid crystal molecules at the center or in the vicinity thereof in the layer plane and in a thickness direction of the liquid crystal layer when a voltage is applied to the liquid crystal layer. This tilt direction (reference alignment direction) has a dominant influence on the viewing angle dependence of each domain. This tilt direction is also an azimuthal angle direction. The reference based on which the azimuthal angle direction is measured is the horizontal direction of the display plane, and the counterclockwise direction is the forward direction (assuming that the display plane is the face of a clock, the 3 o'clock direction is an azimuthal angle of 0° and the counterclockwise direction is the forward direction). Where the tilt directions of the four liquid crystal domains are set such that a difference between any two tilt directions among the four tilt directions is approximately equal to an integral multiple of 90° (e.g., 12 o'clock direction, 9 o'clock direction, 6 o'clock direction and 3 o'clock direction), the viewing angle characteristics are averaged and thus good display can be provided. From the viewpoint of uniformizing the viewing angle characteristics, it is preferable that the area sizes of the four liquid crystal domains in the pixel area are approximately equal to each other. Specifically, it is preferable that a difference between the area size of the largest liquid crystal domain and the area size of the smallest liquid crystal domain among the four liquid crystal domains is 25% or less of the area size of the largest liquid crystal domain.

A vertical alignment type liquid crystal layer shown as an example in the following embodiments contains liquid crystal molecules having a negative dielectric anisotropy (a nematic liquid crystal material having a negative dielectric anisotropy). The pretilt direction defined by one of the alignment films and the pretilt direction defined by the other alignment film are different by 90° from each other. A direction at the middle between these two pretilt directions is defined as the tilt direction (reference alignment direction). No chiral agent is incorporated, and when a voltage is applied to the liquid crystal layer, the liquid crystal molecules in the vicinity of the alignment films are twisted-aligned in accordance with the alignment regulation forces of the alignment films. When necessary, a chiral agent may be incorporated. A VA mode in which the liquid crystal molecules are twisted-aligned by use of a pair of vertical alignment films located such that the pretilt directions (alignment processing directions) thereof are perpendicular to each other is occasionally referred to as the "VATN (Vertical Alignment Twisted Nematic)" mode.

In the VATN mode, it is preferable that the pretilt angles respectively defined by the pair of alignment films are approximately equal to each other. When the pretilt angles are approximately equal to each other, there is an advantage that the display luminance characteristic can be improved. Especially where the difference between the pretilt angles is 1° or less, the tilt direction (reference alignment direction) of the liquid crystal molecules at the center or in the vicinity thereof of the liquid crystal layer can be controlled to be stable and thus the display luminance characteristic can be improved. A conceivable reason for this is that when the difference between the pretilt angles exceeds 1°, the tilt direction is dispersed in accordance with the position in the liquid crystal layer, and as a result, the transmittance is dispersed (i.e., an area having a transmittance lower than the desired transmittance is formed).

Known methods for giving a pretilt direction to the alignment film include a method of performing rubbing processing, a method of performing optical alignment processing, a method of forming a minute structure on a layer below the alignment film in advance and reflecting the minute structure on the surface of the alignment film, a method of obliquely vapor-depositing an inorganic substance such as SiO or the like to form an alignment film having a minute structure on a surface thereof, and the like. From the viewpoint of mass productivity, rubbing processing or optical alignment processing is preferable. Especially, the optical alignment processing, which can be performed in a non-contact manner, does not cause static electricity due to friction unlike the rubbing processing and so can improve the yield. Where an optical alignment film containing a photosensitive group is used, the variance in the pretilt angle can be controlled to be 1° or less. It is preferable that the optical alignment film contains, as the photosensitive group, at least one selected from the group consisting of 4-chalcone group, 4'-chalcone group, coumarin group and cinnamoyl group.

Now, a reason why a dark line appears in the vicinity of an edge portion of the electrode will be described.

In a liquid crystal display device including a vertical alignment type liquid crystal layer in which the pretilt directions are defined by the alignment films, when a voltage for displaying an intermediate gray scale level is applied, an area darker than the intermediate gray scale level to be displayed (dark line) may appear in an area inner to an edge portion of the pixel area, generally parallel to the edge portion, as seen from the frontal direction. In the case where the pixel area is divided into domains, when any of edges of the pixel electrode which are close to the liquid crystal domains has such an edge portion that an azimuthal angle direction perpendicular to the edge portion and directed to the inside of the pixel electrode has an angle exceeding 90° with respect to the tilt direction (reference alignment direction) of the corresponding liquid crystal domain, a dark line appears inner to, and parallel to, this edge portion. This is conceived to occur because the tilt direction of the liquid crystal domain and the direction of the alignment regulation force caused by the oblique electric field generated at the edge of the pixel electrode have components facing each other, and so the alignment of the liquid crystal molecules is disturbed in this area.

A pixel area 10 shown in FIG. 1 having a 4-domain structure will be described. The pixel area 10 shown in FIG. 1 is generally square in correspondence to the generally square pixel electrode for simplifying the explanation, but the present invention is not limited to such a shape of the pixel area. The pixel area 10 may be generally rectangular.

The pixel area 10 includes four liquid crystal domains A, B, C and D. The tilt directions (reference alignment directions) of the liquid crystal domains A, B, C and D are respectively represented as t1, t2, t3 and t4. A difference between any two among these four directions is approximately equal to an integral multiple of 90°. In FIG. 1, the liquid crystal domains A, B, C and D have an equal area size to each other. The example shown in FIG. 1 is the most preferable 4-domain structure from the viewpoint of the viewing angle characteristics. The four liquid crystal domains A, B, C and D are located in a matrix of 2 rows×2 columns.

The pixel electrode has four edges (sides) SD1, SD2, SD3 and SD4. The oblique electric fields generated when a voltage is applied each exhibit an alignment regulation force having a component of a direction (azimuthal angle direction) perpendicular to the respective side and directed to the inside of the pixel electrode. In FIG. 1, the azimuthal angle directions respectively perpendicular to the four edges SD1, SD2, SD3 and SD4 and directed to the inside of the pixel electrode are represented by arrows e1, e2, e3 and e4.

Each of the four liquid crystal domains A, B, C and D is close to two among the four edges SD1, SD2, SD3 and SD4 of the pixel electrode, and in the presence of a voltage, receives alignment regulation forces caused by the oblique electric fields generated along the respective edges.

Regarding an edge portion EG1 at one of the edges of the pixel electrode close to the liquid crystal domain A, the azimuthal angle direction e1 perpendicular to the edge portion EG1 and directed to the inside of the pixel electrode makes an angle exceeding 90° with respect to the tilt direction t1 of the liquid crystal domain A. Therefore, alignment disturbance occurs. As a result, in the liquid crystal domain A, a dark line DL1 appears parallel to the edge portion EG1 when a voltage is applied. A pair of polarizing plates facing each other with the liquid crystal layer interposed therebetween are located such that transmission axes (polarization axes) thereof are perpendicular to each other. More specifically, the polarizing plates are located such that one of the transmission axes is parallel to the horizontal direction of a display plane, and the other transmission axis is parallel to the vertical direction to the display plane. Hereinafter, unless otherwise specified, the polarization axes of polarizing plates are located in this manner.

Similarly, regarding an edge portion EG2 at one of the edges of the pixel electrode close to the liquid crystal domain B, the azimuthal angle direction e2 perpendicular to the edge portion EG2 and directed to the inside of the pixel electrode makes an angle exceeding 90° with respect to the tilt direction t2 of the liquid crystal domain B. Therefore, alignment disturbance occurs. As a result, in the liquid crystal domain B, a dark line DL2 appears parallel to the edge portion EG2 when a voltage is applied.

Similarly, regarding an edge portion EG3 at one of the edges of the pixel electrode close to the liquid crystal domain C, the azimuthal angle direction e3 perpendicular to the edge portion EG3 and directed to the inside of the pixel electrode makes an angle exceeding 90° with respect to the tilt direction t3 of the liquid crystal domain C. Therefore, alignment disturbance occurs. As a result, in the liquid crystal domain C, a dark line DL3 appears parallel to the edge portion EG3 when a voltage is applied.

Similarly, regarding an edge portion EG4 at one of the edges of the pixel electrode close to the liquid crystal domain D, the azimuthal angle direction e4 perpendicular to the edge portion EG4 and directed to the inside of the pixel electrode makes an angle exceeding 90° with respect to the tilt direction t4 of the liquid crystal domain D. Therefore, alignment disturbance occurs. As a result, in the liquid crystal domain D, a dark line DL4 appears parallel to the edge portion EG4 when a voltage is applied.

Where the azimuthal angle of the horizontal direction of the display plane (3 o'clock direction) is 0°, the tilt direction t1 of the liquid crystal domain A is a direction of about 225°, the tilt direction t2 of the liquid crystal domain B is a direction of about 315°, the tilt direction t3 of the liquid crystal domain C is a direction of about 45°, and tilt direction t4 of the liquid crystal domain D is a direction of about 135°. Namely, the liquid crystal domains A, B, C and D are located such that the tilt directions thereof are different by about 90° between adjacent domains among the liquid crystal domains A through D. The angles made between the tilt directions t1, t2, t3 and t4 of the liquid crystal domains A, B, C and D and the azimuthal angle components e1, e2, e3 and e4 of the alignment regulation forces caused by the oblique electric fields generated in the edge portions EG1, EG2, EG3 and EG4 close to the liquid crystal domains A, B, C and D, respectively, are all about 135°.

Figure 2:
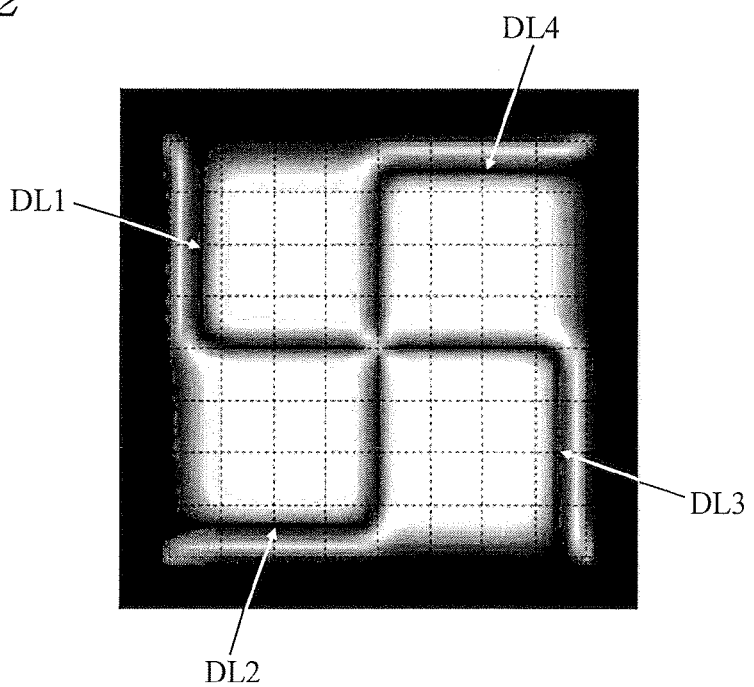
FIG. 2 shows the transmittance of the pixel area shown in FIG. 1 in the presence of a voltage, found by simulations.

The dark lines DL1, DL2, DL3 and DL4 appearing in the pixel area 10 parallel to the edge portions EG1, EG2, EG3 and EG4 respectively as described above lower the transmittance. FIG. 2 shows the transmittance of the pixel area 10 in the presence of a voltage found by simulations. It is understood from FIG. 2 that the dark lines DL1, DL2, DL3 and DL4 appear in the liquid crystal domains A, B, C and D and thus lower the transmittance.

Figure 3:
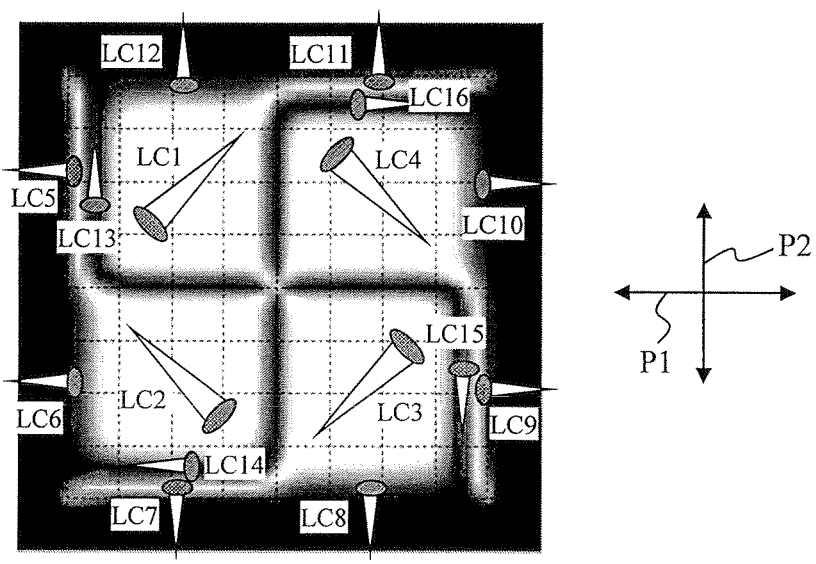
FIG. 3 shows the alignment directions of liquid crystal molecules at the center and in the vicinity thereof of liquid crystal domains and the alignment directions of liquid crystal molecules in the vicinity of edges of the pixel electrode, together with the transmittance found by the simulations shown in FIG. 2.

FIG. 3 schematically shows the alignment directions of the liquid crystal molecules at the center and in the vicinity thereof of the liquid crystal domains and the alignment directions of the liquid crystal molecules in the vicinity of the edges of the pixel electrode, together with the transmittance found by simulations. In FIG. 3, each liquid crystal molecule shown as having a conical shape is tilted such that the bottom face of the cone is closer to the observer than the tip of the cone. FIG. 3 also shows transmission axes P1 and P2 of a pair of polarizing plates.

As can be seen from FIG. 3, liquid crystal molecules LC1 through LC4 at the center and in the vicinity thereof of the liquid crystal domains are each aligned in a direction having an angle of about 45° with respect to the transmission axes P1 and P2 of the pair of polarizing plates located in crossed Nicols. By contrast, liquid crystal molecules LC5 through LC12 on the edges of the pixel electrode each receive an alignment regulation force caused by an oblique electric field generated at the respective edge and are aligned in a direction generally perpendicular to the edge. Thus, liquid crystal molecules located between these areas fall such that the alignment is continuous between the center and the vicinity thereof of each liquid crystal domain and the corresponding edge of the pixel electrode (i.e., the change of the alignment direction of the liquid crystal molecules is continuous). As a result, liquid crystal molecules LC13 through LC16 aligned in a direction generally parallel to, or generally perpendicular to, the transmission axes P1 and P2 of the polarizing plates are present inner with respect to such following edge portions that the azimuthal angle direction perpendicular to each of the edge portion and directed to the inside of the pixel electrode has an angle exceeding 90° with respect to the tilt direction of the corresponding liquid crystal domain (edge portions EG1 through EG4 shown in FIG. 1). Since these liquid crystal molecules LC13 through LC16 do not give any retardation to light passing the liquid crystal layer, the areas in which such liquid crystal molecules 13 through 16 are present have a lower transmittance than in the other areas, namely, appear as dark lines.

Now, with reference to FIG. 4, a method for dividing a pixel area to form domains will be described. FIGS. 4(a), (b) and (c) illustrate a method for dividing the pixel area 10 shown in FIG. 1. FIG. 4(a) shows pretilt directions PA1 and PA2 of an alignment film provided on a TFT substrate (lower substrate), and FIG. 4(b) shows pretilt directions PB1 and PB2 of an alignment film provided on a color filter (CF) substrate (upper substrate). FIG. 4(c) shows the tilt directions and the dark lines DL1 through DL4 when a voltage is applied to the liquid crystal layer.

As shown in FIG. 4(a), an area on the TFT substrate side (area corresponding to one pixel area 10) is divided into two, namely, a left area and a right area, and the vertical alignment film is alignment-processed such that the pretilt directions PA1 and PA2 antiparallel to each other are given to the respective areas (left area and right area) of the vertical alignment film. In this example, optical alignment processing is performed by ultraviolet rays directed obliquely in the direction represented by the arrow.

As shown in FIG. 4(b), an area on the CF substrate side (area corresponding to one pixel area 10) is divided into two, namely, a top area and a bottom area, and the vertical alignment film is alignment-processed such that the pretilt directions PB1 and PB2 antiparallel to each other are given to the respective areas (top area and bottom area) of the vertical alignment film. In this example, optical alignment processing is performed by ultraviolet rays directed obliquely in the direction represented by the arrow.

By bringing together the TFT substrate and the CF substrate alignment-processed as shown in FIGS. 4(a) and (b), the pixel area 10 divided to have domains as shown in FIG. 4(c) can be formed. As can be seen from FIG. 4(c), in each of the liquid crystal domains A, B, C and D, the pretilt direction of the alignment film on the TFT substrate and the pretilt direction of the alignment film on the CF substrate are different by 90° from each other, and a direction at the middle of these two pretilt directions is defined as the tilt direction (reference alignment direction).

As described above with reference to FIG. 1, the dark line DL1 appears in the liquid crystal domain A parallel to the edge portion EG1, and the dark line DL2 appears in the liquid crystal domain B parallel to the edge portion EG2. The dark line DL3 appears in the liquid crystal domain C parallel to the edge portion EG3, and the dark line DL4 appears in the liquid crystal domain D parallel to the edge portion EG4. The dark line DL1 and the dark line DL3 are generally parallel to the vertical direction of the display plane, and the dark line DL2 and the dark line DL4 are generally parallel to the horizontal direction of the display plane. Namely, the edge portion EG1 and the edge portion EG3 are generally parallel to the vertical direction of the display plane, and the edge portion EG2 and the edge portion EG4 are generally parallel to the horizontal direction of the display plane.

Figure 4:
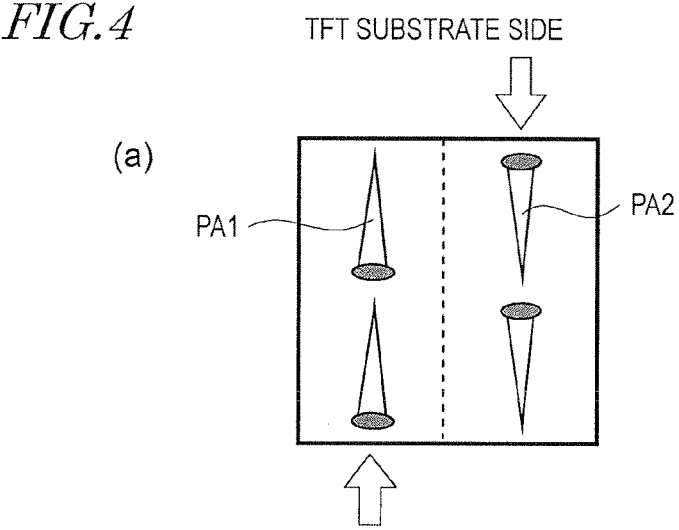
FIG. 4 shows a method for dividing the pixel area shown in FIG. 1.
Figure 4:
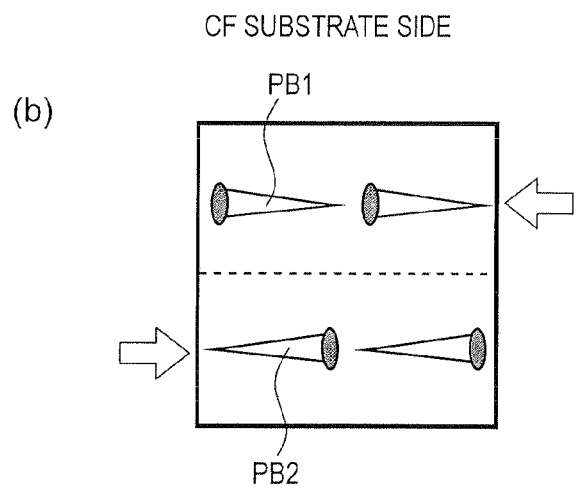
Figure 4:
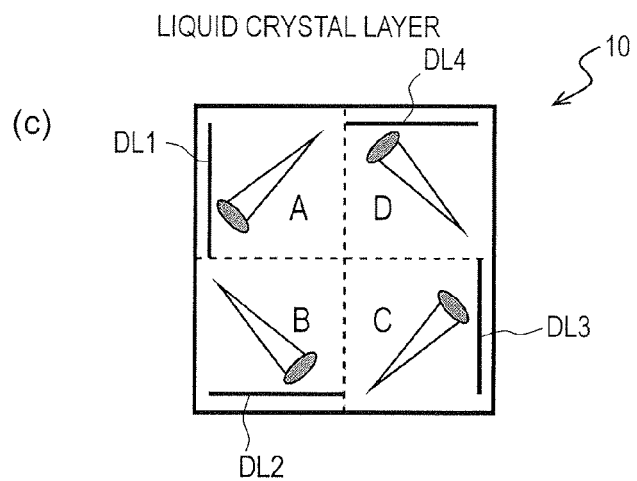

The method for dividing one pixel into four liquid crystal domains A through D (locations of the liquid crystal domains A through D in the pixel area) is not limited to the example shown in FIG. 4.

Figure 5:
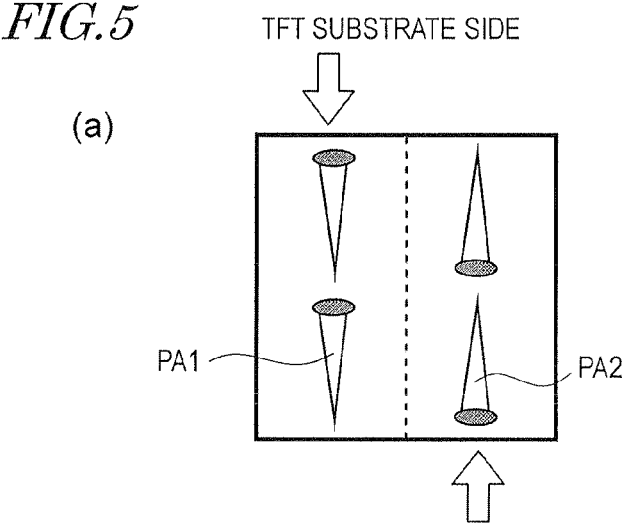
FIG. 5 shows another example of method for dividing the pixel area.
Figure 5:
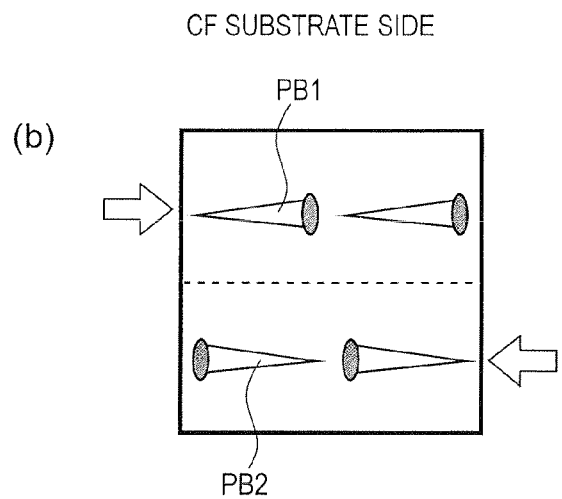
Figure 5:
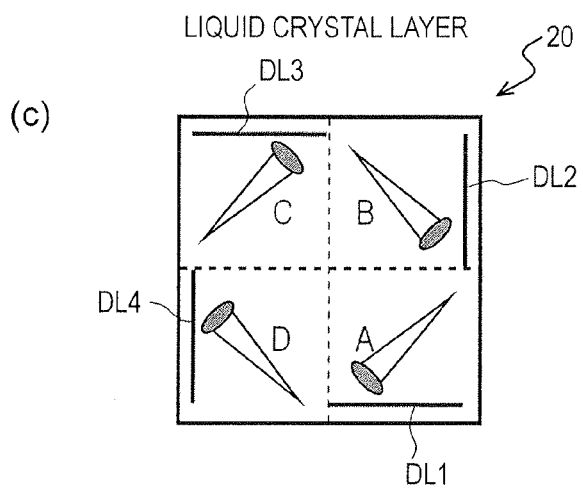

For example, by bringing together the TFT substrate and the CF substrate alignment-processed as shown in FIGS. 5(a) and (b), a pixel area 20 divided to have domains as shown in FIG. 5(c) can be formed. Like the pixel area 10, the pixel area 20 includes four liquid crystal domains A through D. The tilt directions of the liquid crystal domains A through D are the same as those of the liquid crystal domains A through D in the pixel area 10.

It should be noted that in the pixel area 10, the liquid crystal domains A through D are located in the order of top left, bottom left, bottom right and top right (i.e., counterclockwise from top left); whereas in the pixel area 20, the liquid crystal domains A through D are located in the order of bottom right, top right, top left and bottom left (i.e., counterclockwise from bottom right). A reason for this is that the pretilt directions of the left area and the right area on the TFT substrate side are opposite, and the pretilt directions of the top area and the bottom area on the CF substrate side are opposite, between the pixel area 10 and the pixel area 20. The dark lines DL1 and DL3 appearing in the liquid crystal domains A and C are generally parallel to the horizontal direction of the display plane, and the dark lines DL2 and DL4 appearing in the liquid crystal domains B and D are generally parallel to the vertical direction of the display plane. Namely, the edge portions EG1 and EG3 are generally parallel to the horizontal direction of the display plane, and the edge portions EG2 and EG4 are generally parallel to the vertical direction of the display plane.

Figure 6:
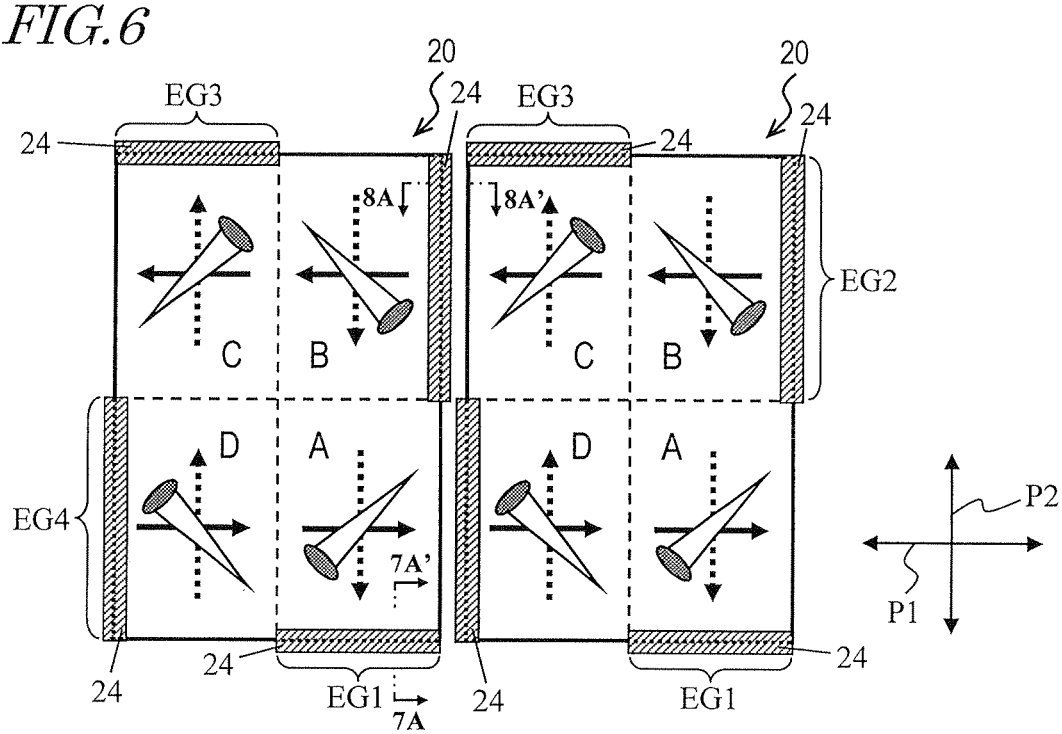
FIG. 6 is a plan view schematically showing two pixel areas of a liquid crystal display device in a preferable embodiment according to the present invention.

Now, with reference to FIGS. 6, 7 and 8, a specific structure of a liquid crystal display device 100 in this embodiment will be described. FIG. 6 is a plan view schematically showing two pixel areas 20 of the liquid crystal display device 100, and FIG. 7 and FIG. 8 are respectively cross-sectional views taken along lines 7A-7A' and 8A-8A' in FIG. 6.

Figure 7:
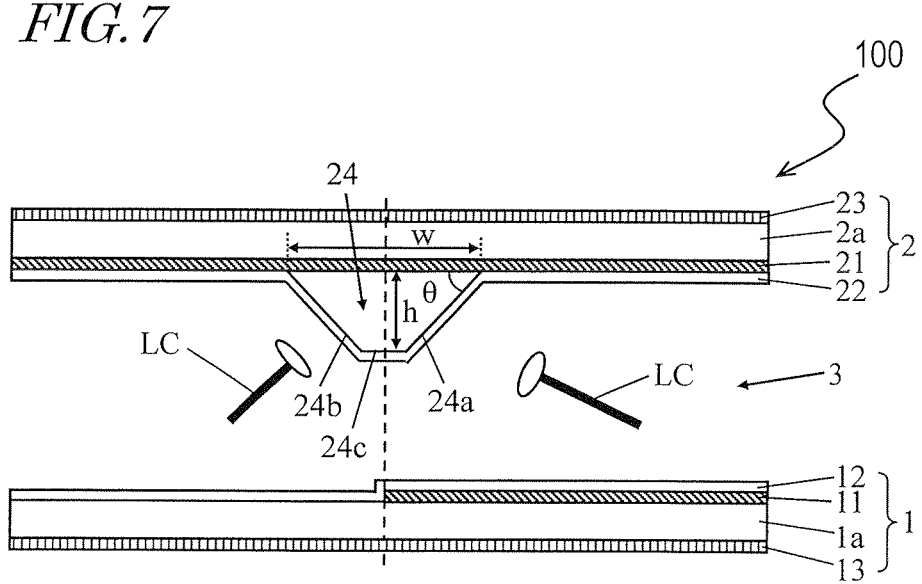
FIG. 7 schematically shows the liquid crystal display device in the preferable embodiment according to the present invention, and is a cross-sectional view taken along line 7A-7A' in FIG. 6.
Figure 8:
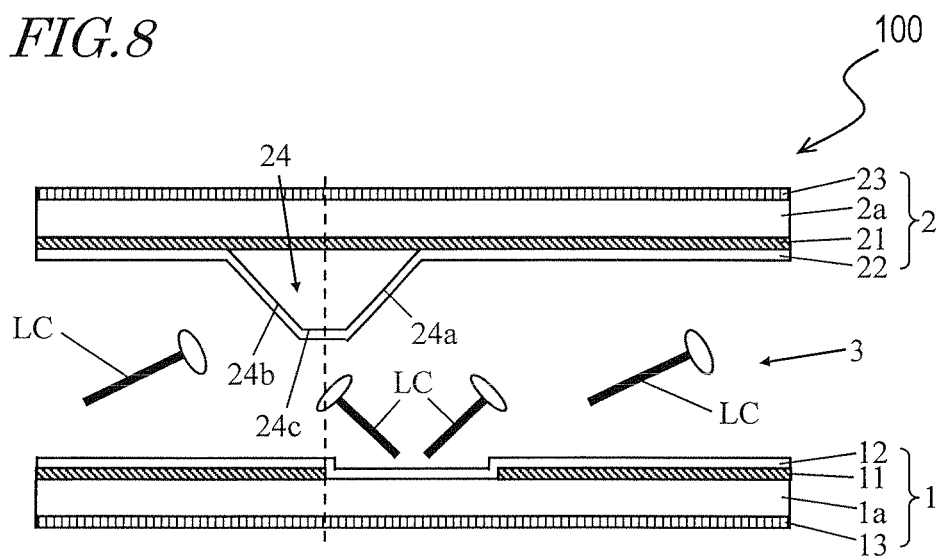
FIG. 8 schematically shows the liquid crystal display device in the preferable embodiment according to the present invention, and is a cross-sectional view taken along line 8A-8A' in FIG. 6.

As shown in FIG. 7 and FIG. 8, the liquid crystal display device 100 includes a vertical alignment type liquid crystal layer 3, and a TFT substrate (also referred to as the "active matrix substrate" occasionally) 1 and a CF substrate (also referred to as the "counter substrate" occasionally) 2 facing each other with the liquid crystal layer 3 interposed therebetween, a pixel electrode 11 included in the TFT substrate 1 on the liquid crystal layer 3 side, and a counter electrode 21 included in the CF substrate 2 on the liquid crystal layer 3 side.

The liquid crystal layer 3 contains liquid crystal molecules LC having a negative dielectric anisotropy (i.e., $\Delta\varepsilon<0$). The pixel electrode 11 is provided on a transparent plate (e.g., glass plate) 1a, and the counter electrode 21 is provided on a transparent plate (e.g., glass plate) 2a.

A first alignment film 12 is provided between the pixel electrodes 11 and the liquid crystal layer 3, and a second alignment film 22 is provided between the counter electrode 21 and the liquid crystal layer 3. A pair of polarizing plates 13 and 23 are provided so as to face each other with the liquid crystal layer 3 interposed therebetween. As shown in FIG. 6, the pair of polarizing plates 13 and 23 are located such that transmission axes (polarization axes) P1 and P2 thereof are generally perpendicular to each other.

Although not shown, the TFT substrate 1 further includes a thin film transistor (TFT), a gate bus line for supplying a scanning signal to the TFT, and a source bus line for supplying a vide signal to the TFT. The gate bus line is provided so as to extend generally parallel to the horizontal direction of the display plane, and the source bus line is provided so as to extend generally parallel to the vertical direction of the display plane. Accordingly, FIG. 7 is a cross-sectional view taken along a direction perpendicular to the direction in which the gate bus line extends (i.e., a view showing a cross-section which crosses the gate bus line), and FIG. 8 is a cross-sectional view taken along a direction perpendicular to the direction in which the source bus line extends (i.e., a view showing a cross-section which crosses the source bus line). The CF substrate 2 further includes a color filter and a black matrix (light shielding layer).

The liquid crystal display device 100 includes a plurality of pixel areas 20 located in a matrix. As shown in FIG. 6, each pixel area 20 is divided into domains like the pixel area 20 shown in FIG. 5(c). Namely, the pixel area 20 includes four liquid crystal domains A through D respectively having tilt directions of about 225°, about 315°, about 45° and about 135° when a voltage is applied between the pixel electrode 11 and the counter electrode 21. The transmission axis P1 of one of the pair of polarizing plates 13 and 23 is generally parallel to the horizontal direction of the display plane, and the transmission axis P2 of the other polarizing plate is generally parallel to the vertical direction of the display plane. Accordingly, the tilt directions of the liquid crystal domains A through D each have an angle of about 45° with respect to the transmission axes P1 and P2 of the polarizing plates 13 and 23.

In FIG. 6, in areas corresponding to the liquid crystal domains A through D, the pretilt directions of the first alignment film 12 are represented by the dashed line arrows, and the pretilt directions of the second alignment film 22 are represented by the solid line arrows. These arrows representing the pretilt directions show that the liquid crystal molecules LC are pretilted such that the end on the arrow tip side is farther from the substrate (substrate on which the respective alignment film is provided) than the end on the opposite side. In the area corresponding to each of the liquid crystal domains A through D, the pretilt direction of the first alignment film 12 and the pretilt direction of the second alignment film 22 are different by about 90° from each other. It is preferable that the pretilt angle defined by the first alignment film 12 and the pretilt angle defined by the second alignment film 22 are approximately equal to each other as described above.

In the liquid crystal display device 100 in this embodiment, as shown in FIG. 6, FIG. 7 and FIG. 8, the CF substrate 2 includes a plurality of ribs 24 (protrusion structures) provided in areas corresponding to the edge portions EG1 through EG4. As shown in FIG. 7 and FIG. 8, each rib 24 includes two side faces 24a and 24b inclining with respect to the surface of the plate 2a and an apex surface 24c, and extends generally parallel to the corresponding edge portion.

The rib 24 exhibits an alignment regulation force of aligning the liquid crystal molecules LC generally vertically to the side surfaces 24a and 24b, namely, an alignment regulation force of causing the liquid crystal molecules LC to fall in a direction generally perpendicular to the direction in which the rib 24 extends. The ribs 24 are formed of, for example, a transparent dielectric material (e.g., a resin material).

According to the multi-domain structure in the pixel area 20, the tilt direction of the liquid crystal domain A has an angle exceeding 90° with respect to the azimuthal angle direction perpendicular to the edge portion EG1 and directed to the inside of the pixel electrode 11. The tilt direction of the liquid crystal domain B has an angle exceeding 90° with respect to the azimuthal angle direction perpendicular to the edge portion EG2 and directed to the inside of the pixel electrode 11. The tilt direction of the liquid crystal domain C has an angle exceeding 90° with respect to the azimuthal angle direction perpendicular to the edge portion EG3 and directed to the inside of the pixel electrode 11. The tilt direction of the liquid crystal domain D has an angle exceeding 90° with respect to the azimuthal angle direction perpendicular to the edge portion EG4 and directed to the inside of the pixel electrode 11. Therefore, in the vicinity of the edge portions EG1, EG2, EG3 and EG4, the dark line would appear if no measure was taken.

In the liquid crystal display device 100 in this embodiment, the CF substrate 2 includes the ribs 24 in areas in which the dark line would appear if no measure was taken. The alignment regulation force of each rib 24 provided in this manner can shift the dark line outward with respect to the position where the rib 24 would appear if no measure was taken (in the azimuthal angle direction perpendicular to the edge portion and directed outward with respect to the pixel electrode 11). Therefore, the transmittance of the pixel area 20 can be improved. As described below in more detail, the effect of improving the transmittance realized by providing the ribs 24 depends on the relative positions of each rib 24 and the corresponding edge portion. Where the rib 24 is located at the most preferable position, the dark line can be fixed almost on the edge portion. Namely, the appearance of the dark line in the pixel area can be substantially prevented.

Figure 9:
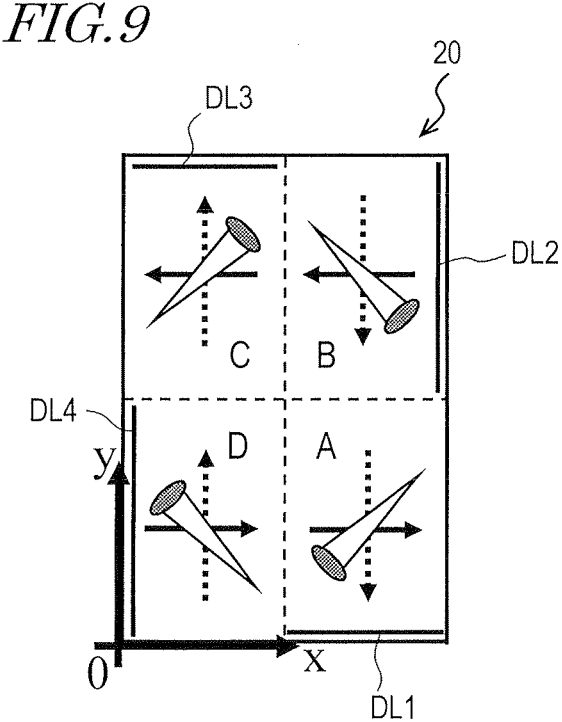
FIG. 9 is provided for explaining axis settings used for discussing preferable positions of ribs by simulations performed by the three-dimensional finite element analysis.

Now, preferable positions of the ribs 24 investigated by simulations performed by the three-dimensional finite element analysis will be described. Specifically, while the position of the rib 24 corresponding to the edge portion EG1 generally parallel to the direction in which the gate bus line extends (i.e., generally parallel to the horizontal direction of the display plane; the cross-section of such a rib 24 is shown in FIG. 7) and the position of the rib 24 corresponding to the edge portion EG2 generally parallel to the direction in which the source bus line extends (i.e., generally parallel to the vertical direction of the display plane; the cross-section of such a rib 24 is shown in FIG. 8) were changed, the alignment states of the liquid crystal molecules LC and the transmittance profile of the pixel area 20 were calculated. For the calculations, the size of one pixel area 20 was set to 200 μm (horizontal direction)×300 μm (vertical direction), the pretilt angle defined by each of the first alignment film 12 and the second alignment film 22 was set to 88.5°, and the thickness of the liquid crystal layer 3 was set to 3.4 μm. The height h of the rib 24 was set to 1 μm, the width w of the rib 24 was set to 7.5 μm, and the inclining angle (taper angle) θ of the side surfaces 24a and 24b of the rib 24 with respect to the substrate surface was set to 20° (see FIG. 7). As shown in FIG. 9, the left bottom corner of the pixel area 20 was set as the origin, the x axis was set as horizontal direction, and the y axis was set as the vertical direction. The position of the rib 24 corresponding to the edge portion EG1 was changed along the y axis direction, and the calculations were performed at the position of x=150 μm. The position of the rib 24 corresponding to the edge portion EG2 was changed along the x axis direction, and the calculations were performed at the position of y=200 μm. In this example, the space between two pixel electrodes 11 adjacent to each other in the column direction (upper pixel electrode 11 and lower pixel electrode 11) is large. Therefore, for making the calculations for the former rib 24, the presence of the adjacent pixel electrode 11 was not considered. By contrast, the space between two pixel electrodes 11 adjacent to each other in the row direction (left pixel electrode 11 and right pixel electrode 11) is small. Therefore, for making the calculations for the latter rib 24, the presence of the adjacent pixel electrode 11 was considered.

Figure 10:
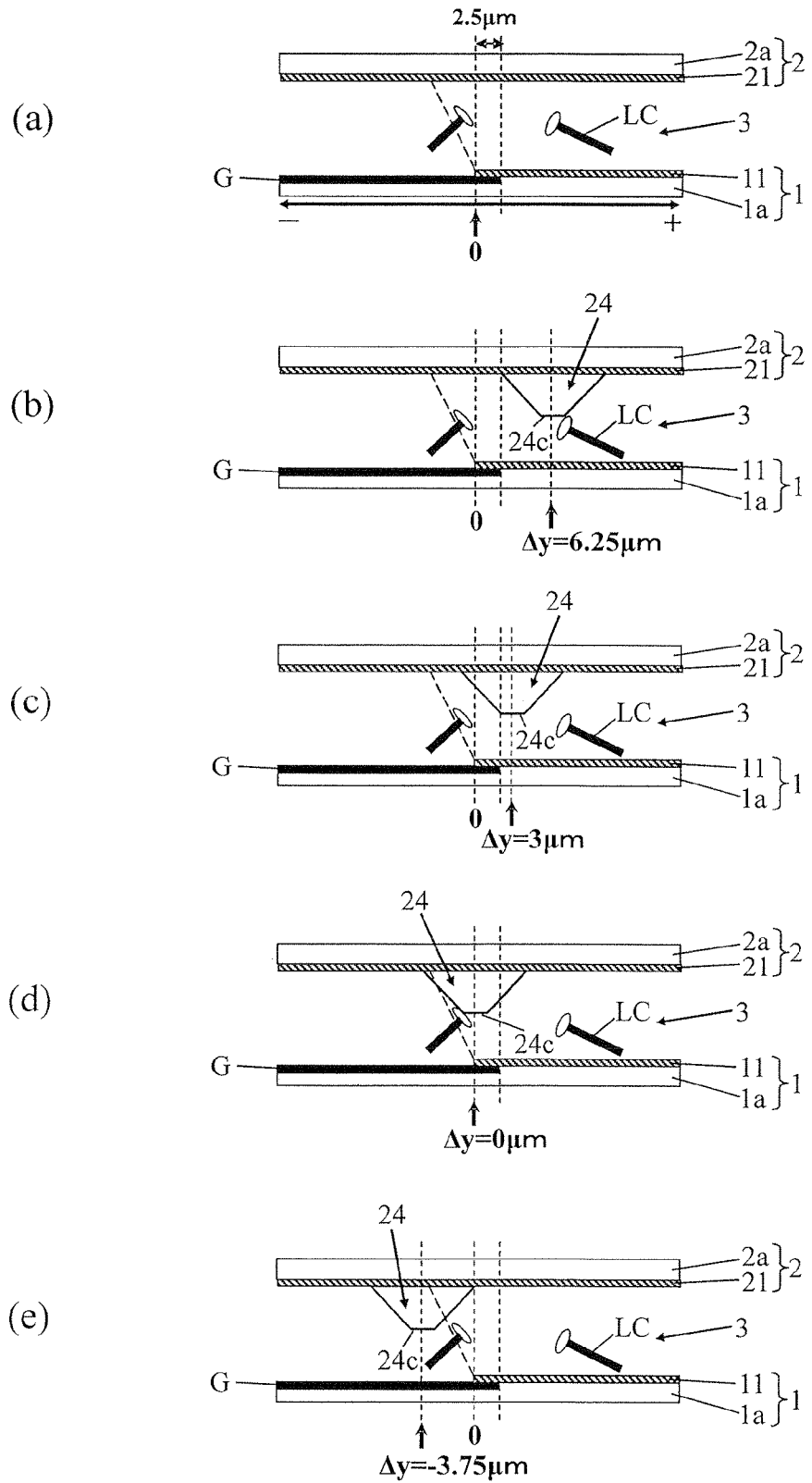
FIGS. 10(a) through (e) are provided for explaining conditions under which the alignment states of the liquid crystal molecules and the transmittance profiles of the pixel area are calculated.

First, the calculation results on the rib 24 corresponding to the edge portion EG1 will be described. Specifically, the calculations were performed on five cases shown in FIGS. 10(a) through (e). FIG. 10(a) shows the case where the rib 24 is not provided. FIGS. 10(b) through (e) show the cases where the rib 24 is provided. As shown in FIG. 10(a), the edge of the pixel electrode 11 on the y axis is set as the reference position (0), and the right direction is set as the positive (+) direction and the left direction is set as the negative (−) direction. The shift of the center of the rib 24 in a width direction (center of the apex surface 24c; hereinafter, referred to as the "ridgeline") with respect to this reference position is Δy. With such settings, FIGS. 10(b) through (e) respectively correspond to the cases where Δy=6.25 μm, 3 μm, 0 μm and −3.75 μm. As shown in FIG. 10(a), the edge of the pixel electrode 11 (edge portion EG1) overlaps a gate bus line G by 2.5 μm with an interlayer insulating film (not shown) interposed therebetween.

Figure 11:
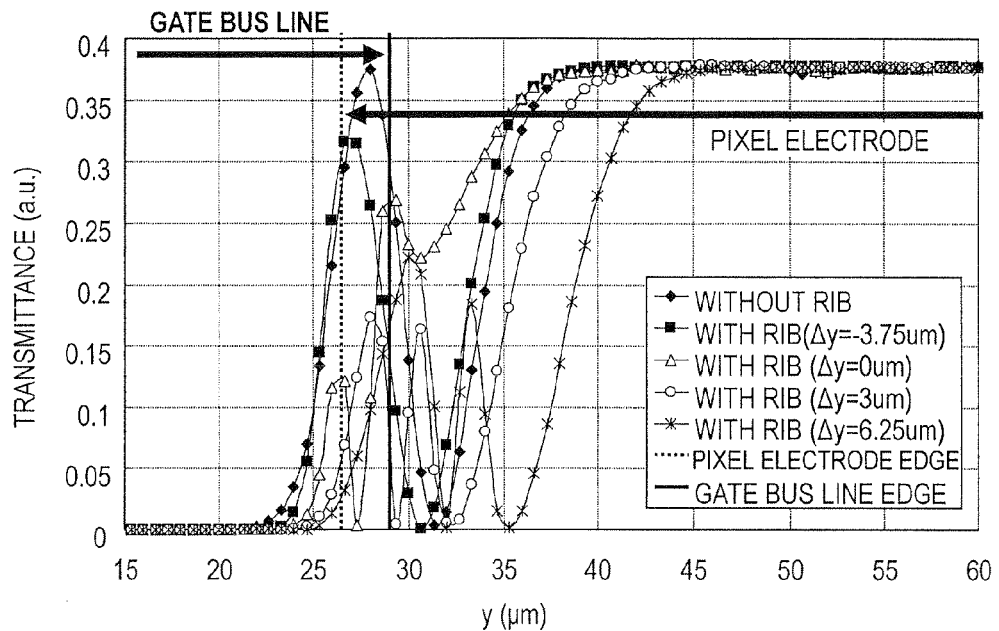
FIG. 11 is a graph showing the transmittance profiles found by the calculations performed under the conditions shown in FIGS. 10(a) through (e).

FIG. 11 shows the calculation results on the profile transmittance. As can be seen from FIG. 11, in the case where the rib 24 is provided at the position of Δy=0 μm, as compared with the case where the rib 24 is not provided, a portion of the display area where the transmittance takes the minimum value can be shifted outward (the display area is an area where a light shielding member such as the gate bus line G or the like is not provided; in this example, is an area where y≥29 μm). Therefore, the light utilization factor of the pixel area 20 is increased, and thus the transmittance is improved. It is understood from FIG. 11 that in the case where the rib 24 is provided at the positions of Δy=−3.75 μm, Δy=3 μm and Δy=6.25 μm, the portion where the transmittance takes the minimum value cannot be shifted sufficiently outward and so it is difficult to sufficiently improve the transmittance.

Figure 12:
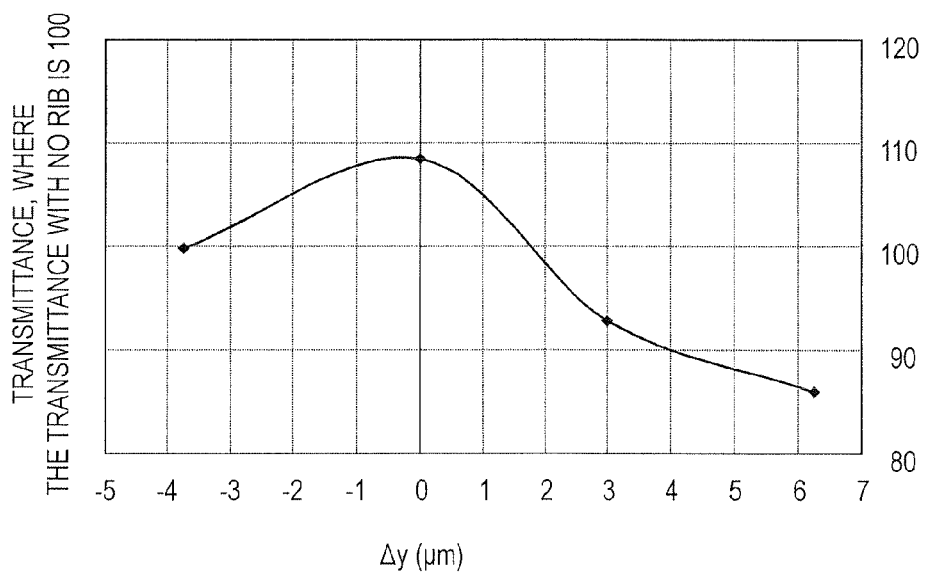
FIG. 12 is a graph showing the relationship between the transmittance and the position of the rib, where the transmittance obtained with no rib is 100.

FIG. 12 shows the relationship between the transmittance and the position of the rib 24, where the transmittance obtained with no rib 24 is 100. It is understood from FIG. 12 that when Δy (μm) fulfills the relationship of −3.7≤Δy≤1.8, the transmittance can be improved as compared with the case where the rib 24 is not provided. From the viewpoint of realizing a higher transmittance, it is more preferable that −2.0≤Δy≤1.0, and it is most preferable that −1.0≤Δy≤0.5 (i.e., the rib 24 substantially overlaps the edge portion EG1). When −2.0≤Δy≤1.0, the transmittance can be improved by 5% or more as compared with the case where the rib 24 is not provided. When −1.0≤Δy≤0.5, the transmittance is more improved.

Figure 13:
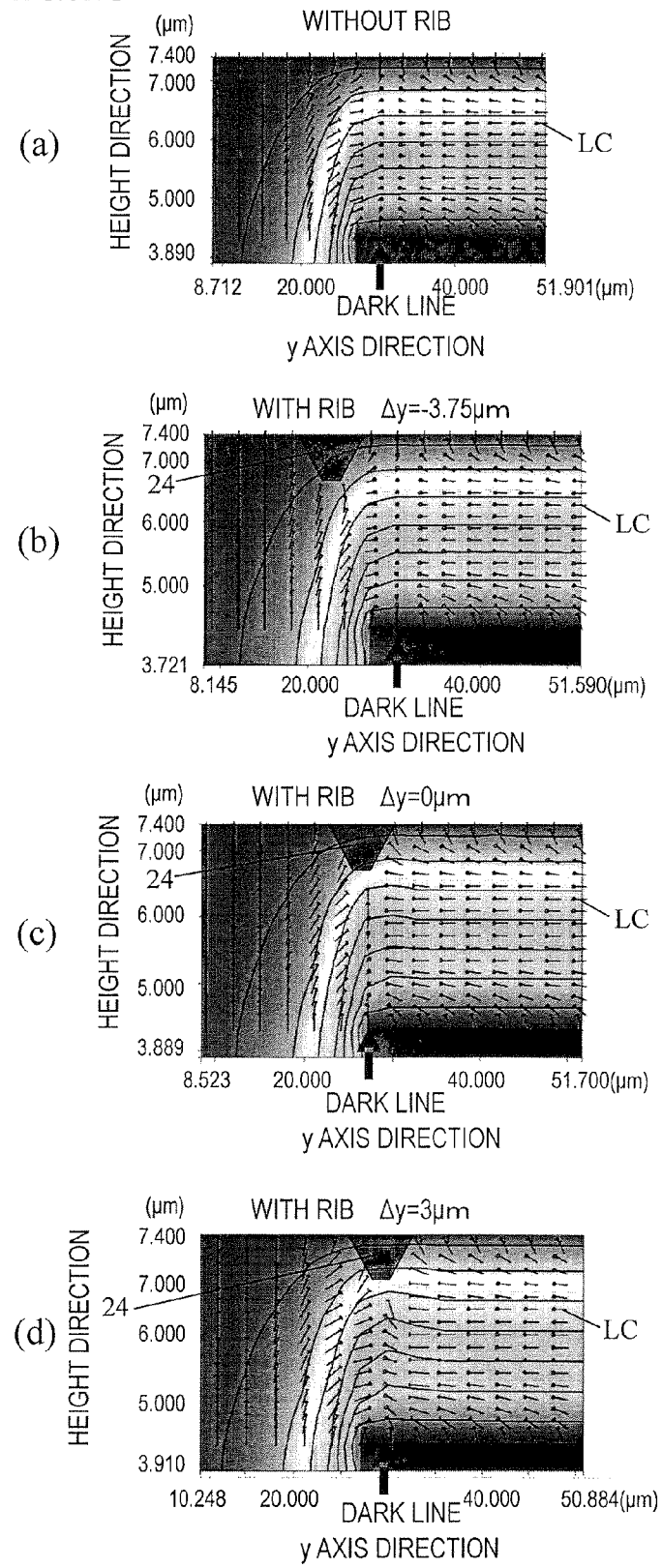
FIGS. 13(a) through (d) show the alignment states of the liquid crystal molecules found by the calculations performed under the conditions shown in FIGS. 10(a) and (c) through (e).

FIGS. 13(*a*) through (*d*) show the calculation results on the alignment states of the liquid crystal molecules LC in the case where the rib 24 is not provided and in the case where the rib 24 is provided at the positions of Δy=−3.75 μm, Δy=0 μm and Δy=3 μm.

In the case where the rib 24 is not provided, as shown in FIG. 13(*a*), the alignment direction of the liquid crystal molecules LC in the liquid crystal domain A does not match the alignment direction of the liquid crystal molecules LC inclined by the oblique electric field generated in the edge portion EG1. As a result, in order to keep the continuity of the alignment, an area in which the liquid crystal molecules LC are inclined in a direction generally parallel to the transmission axis P1 of the polarizing plate (the direction generally perpendicular to the transmission axis P2 of the polarizing plate 23; the direction toward the observer of the figure) is formed inner with respect to the edge portion EG1. This area appears as a dark line.

In the case where the rib 24 is provided at the position of Δy=−3.75 μm, as shown in FIG. 13(*b*), the position at which the dark line appears is not much different from such a position in the case where the rib 24 is not provided. A reason for this is that because the rib 24 is located outer with respect to the edge portion EG1 of the pixel electrode 11, the alignment regulation force of the rib 24 is not sufficiently exerted on the liquid crystal molecules LC in the liquid crystal domain A (on the pixel electrode 11).

By contrast, in the case where the rib 24 is provided at the position of Δy=0 μm, as shown in FIG. 13(*c*), the position at which the dark line appears is approximately on the edge portion EG1. Namely, the dark line is like being fixed to the edge portion EG1 by a pin. As can be seen from this, when the rib 24 is located such that the ridgeline thereof (center in the width direction) substantially overlaps the edge portion EG1, the dark line can be expelled from the display area (pushed outward with respect to the pixel electrode 11).

In the case where the rib 24 is provided at the position of Δy=3 μm, as shown in FIG. 13(*d*), the position at which the dark line appears is inner with respect to the edge portion EG1, and thus the dark line invades the display area. Therefore, the effect of improving the transmittance is decreased.

Figure 14:
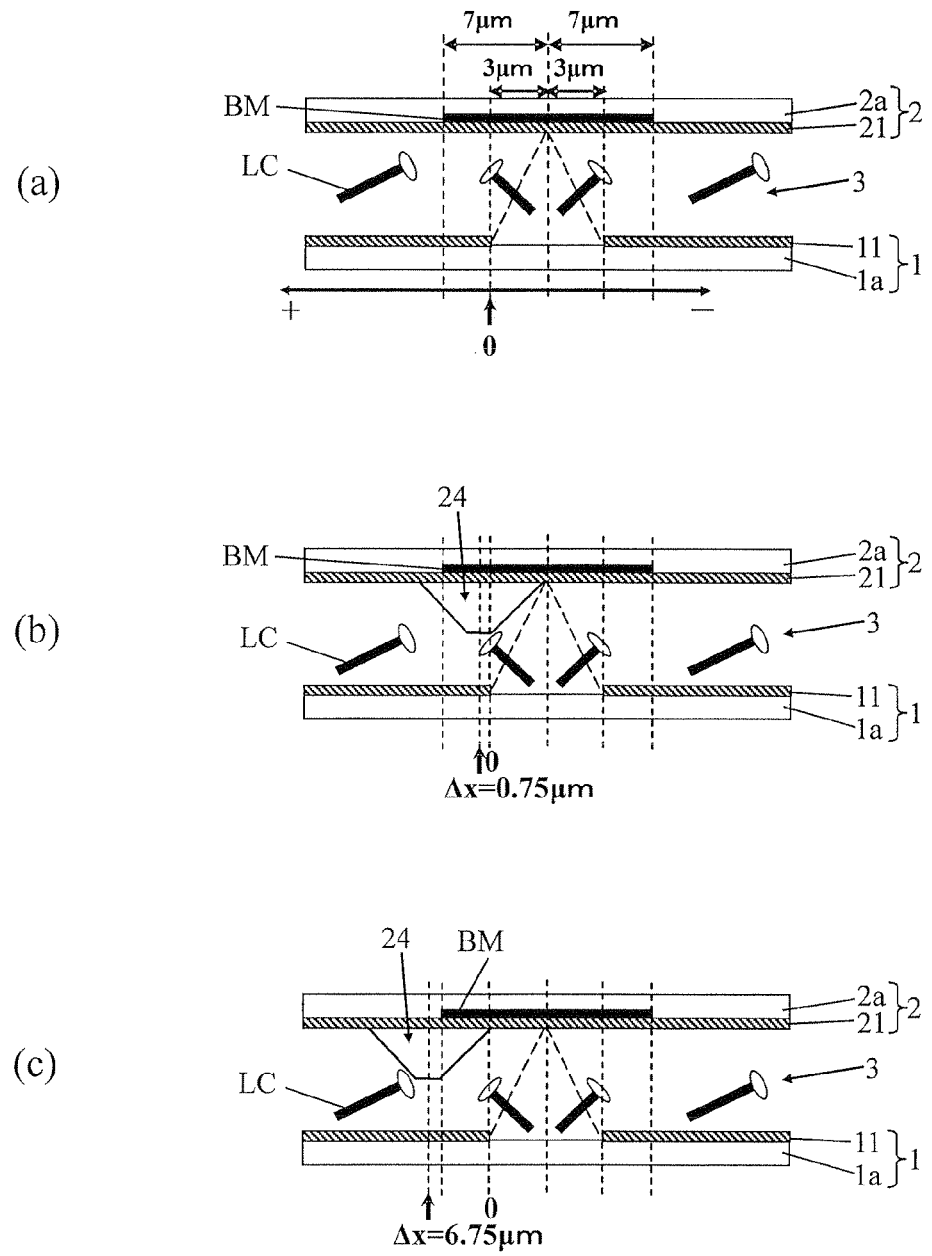
FIGS. 14(a) through (c) are provided for explaining conditions under which the alignment states of the liquid crystal molecules and the transmittance profiles of the pixel area are calculated.

Next, the calculation results on the rib 24 corresponding to the edge portion EG2 will be described. Specifically, the calculations were performed on three cases shown in FIGS. 14(*a*) through (*c*). FIG. 14(*a*) shows the case where the rib 24 is not provided. FIGS. 14(*b*) and (*c*) show the cases where the rib 24 is provided. As shown in FIG. 14(*a*), the edge of the pixel electrode 11 on the x axis is set as the reference position (0), and the left direction is set as the positive (+) direction and the right direction is set as the negative (−) direction. The shift of the ridgeline of the rib 24 with respect to this reference position is set to set as Δx. With such settings, FIGS. 14(*b*) and (*c*) respectively correspond to the cases where Δx=0.75 μm and 6.75 μm. As shown in FIG. 14(*a*), the space between two adjacent pixel electrodes 11 is 6 μm (=3 μm+3 μm), and the black matrix BM provided in the CF substrate 2 has a width of 14 μm (=7 μm+7 μm) and partially overlaps the pixel electrode 11.

Figure 15:
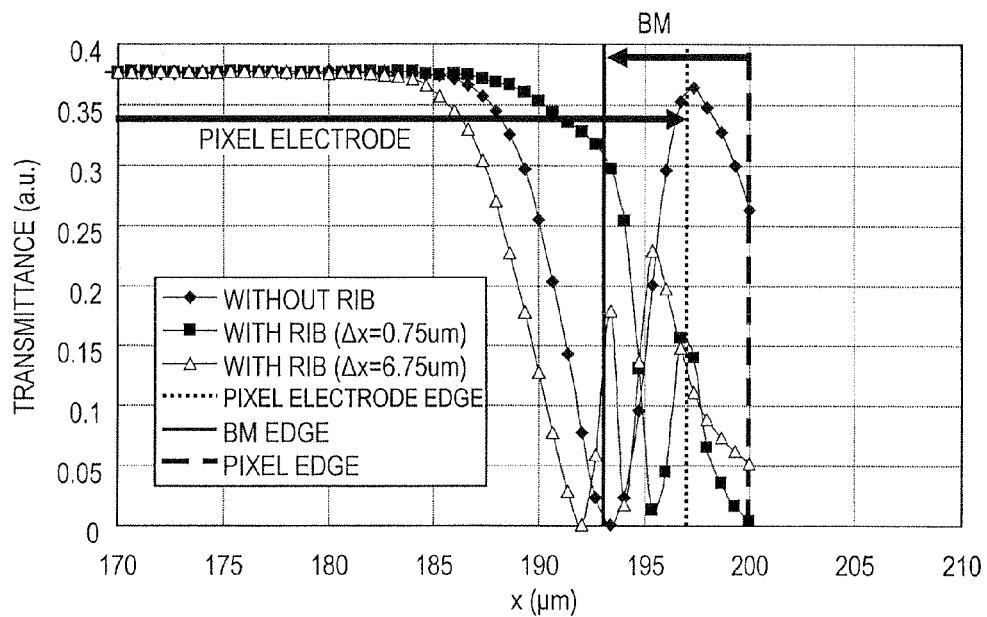
FIG. 15 is a graph showing the transmittance profiles found by the calculations performed under the conditions shown in FIGS. 14(a) through (c).

FIG. 15 shows the calculation results on the transmittance profile. As can be seen from FIG. 15, where the rib 24 is provided at the position of Δx=0.75 μm, as compared with the case where the rib 24 is not provided, a portion of the display area where the transmittance takes the minimum value can be shifted outward (the display area is an area where a light shielding member such as the black matrix BM or the like is not provided; in this example, is an area where x≤193 μm). Therefore, the light utilization factor of the pixel area 20 is increased, and thus the transmittance is improved. It is understood from FIG. 15 that in the case where the rib 24 is provided at the position of Δx=6.75 μm, the portion where the transmittance takes the minimum value cannot be shifted sufficiently outward and so it is difficult to sufficiently improve the transmittance.

Figure 16:
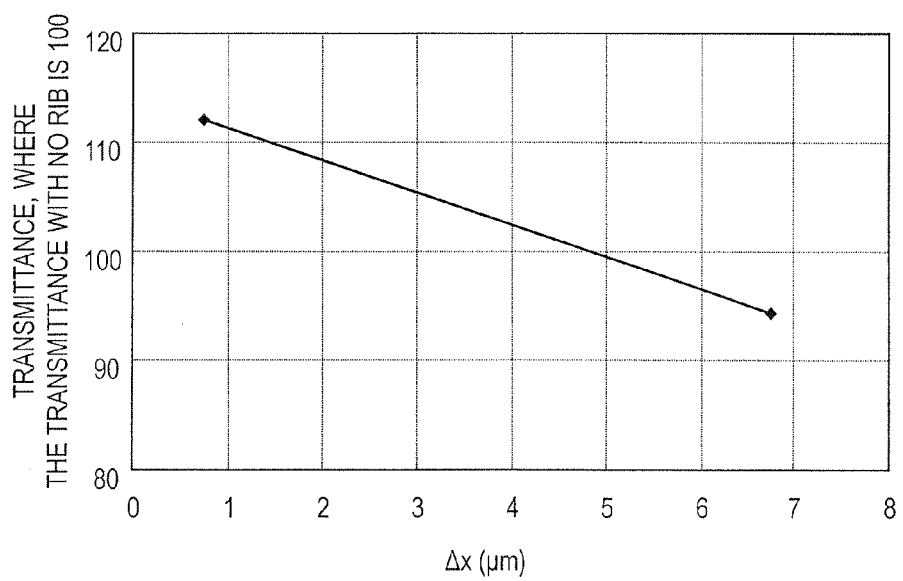
FIG. 16 is a graph showing the relationship between the transmittance and the position of the rib, where the transmittance obtained with no rib is 100.

FIG. 16 shows the relationship between the transmittance and the position of the rib 24, where the transmittance obtained with no rib 24 is 100. It is understood from FIG. 16 that when Δx (μm) fulfills the relationship of 0≤Δx≤4.9, the transmittance can be improved as compared with the case where the rib 24 is not provided. From the viewpoint of realizing a higher transmittance, it is more preferable that 0≤Δx≤3.0, and it is most preferable that 0≤Δx≤1.0 (i.e., the rib 24 substantially overlaps the edge portion EG1). When 0≤Δx≤3.0, the transmittance can be improved by 5% or more as compared with the case where the rib 24 is not provided. When 0≤Δx≤1.0, the transmittance is more improved.

In this example, a case where Δx has a negative value is not assumed. A reason for this is that because the space between two adjacent pixel electrodes 11 is as narrow as if the rib 24 is provided at a position where Δx has a negative value, the alignment state of the adjacent pixel electrode is adversely influenced.

Figure 17:
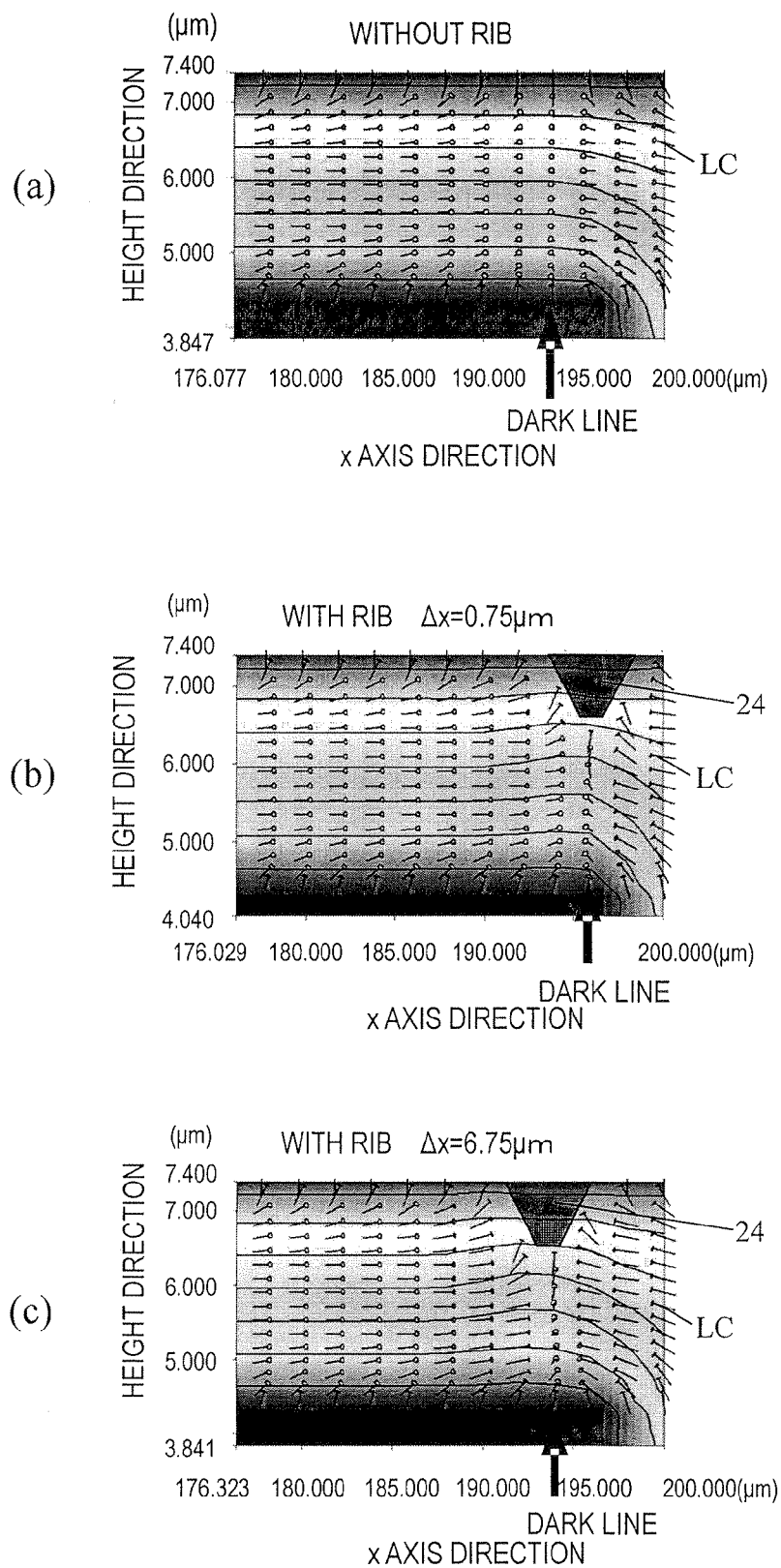
FIGS. 17(a) through (c) show the alignment states of the liquid crystal molecules found by the calculations performed under the conditions shown in FIGS. 14(a) through (c).

FIGS. 17(*a*) through (*c*) show the calculation results on the alignment states of the liquid crystal molecules LC in the case where the rib 24 is not provided and in the case where the rib 24 is provided at the positions of Δx=0.75 μm, and Δx=6.75 μm.

In the case where the rib 24 is not provided, as shown in FIG. 17(*a*), the alignment direction of the liquid crystal molecules LC in the liquid crystal domain B does not match the alignment direction of the liquid crystal molecules LC inclined by the oblique electric field generated in the edge portion EG2. As a result, in order to keep the continuity of the alignment, an area in which the liquid crystal molecules LC are inclined in a direction generally parallel to the transmission axis P2 of the polarizing plate (the direction generally perpendicular to the transmission axis P1 of the polarizing plate 13; the direction toward the observer of the figure) is formed inner with respect to the edge portion EG2. This area appears as a dark line.

By contrast, in the case where the rib 24 is provided at the position of Δx=0.75 μm, as shown in FIG. 17(*b*), the position at which the dark line appears is approximately on the edge portion EG2. Namely, the dark line is like being fixed to the edge portion EG2 by a pin. As can be seen from this, when the rib 24 is located such that the ridgeline (center in the width direction) substantially overlaps the edge portion EG2, the dark line can be expelled from the display area (pushed outward with respect to the pixel electrode 11).

In the case where the rib 24 is provided at the position of Δx=6.75 μm, as shown in FIG. 17(*c*), the position at which the dark line appears is inner with respect to the edge portion EG2, and thus the dark line invades the display area. Therefore, the effect of improving the transmittance is decreased.

As described above, it is most preferable that the rib 24 is located such that the ridgeline is approximately on the edge portion. When the rib 24 is too outer or too inner with respect to the edge portion, a sufficient effect may not provided. In this example, the calculation results on the rib corresponding to the edge portion EG1 and the rib 24 corresponding to the edge portion EG2 are shown. A preferable position of the rib 24 corresponding to the edge portion EG3 is substantially the same as that of the rib 24 corresponding to the edge portion EG1. A preferable position of the rib 24 corresponding to the edge portion EG4 is substantially the same as that of the rib 24 corresponding to the edge portion EG2.

Accordingly, where the ribs 24 corresponding to the edge portions EG1, EG2, EG3 and EG4 are respectively referred to as a first rib, a second rib, a third rib and a fourth rib, it is preferable that a shift S1 (μm) of the ridgeline of the first rib 24 from the edge portion EG1, a shift S2 (μm) of the ridgeline of the second rib 24 from the edge portion EG2, a shift S3 (μm) of the ridgeline of the third rib 24 from the edge portion EG3, and a shift 54 (μm) of the ridgeline of the fourth rib 24 from the edge portion EG4, all as seen from the frontal direction, fulfill the relationships of $-3.7 \leq S1 \leq 1.8$, $0 \leq S2 \leq 4.9$, $-3.7 \leq S3 \leq 1.8$ and $0 \leq S4 \leq 4.9$ where the inner side with respect to the edges of the pixel electrode 11 is represented by a positive numerical value and the outer side with respect to the edges of the pixel electrode 11 is represented by a negative numerical value.

As understood from the above description, it is most preferable that the first rib 24 is located such that the ridgeline thereof substantially overlaps the edge portion EG1, and that the second rib 24 is located such that the ridgeline thereof substantially overlaps the edge portion EG2, when seen from the frontal direction in both cases. It is most preferable that the third rib 24 is located such that the ridgeline thereof substantially overlaps the edge portion EG3, and that the fourth rib 24 is located such that the ridgeline thereof substantially overlaps the edge portion EG4, when seen from the frontal direction in both cases.

The height h and the width w of the rib 24 and the inclining angle θ of the side faces 24a and 24b of the rib 24 are not limited to the values described above as examples. When the height h and the width w of the rib 24 are too small, the alignment regulation force by the rib 24 may be weak. Therefore, from the viewpoint of obtaining a sufficiently strong alignment regulation force with certainty, it is preferable that the height h of the rib 24 is 0.5 μm or greater and that the width w of the rib 24 is 5.0 μm or greater. It should be noted that in the area having the rib 24, the liquid crystal layer 3 is made thinner by the height of the rib 24 and so the retardation given to light by the liquid crystal layer 3 is decreased. The pretilt angle of the liquid crystal molecules LC in the vicinity of the rib 24 is different from the pretilt angle of the liquid crystal molecules LC on the second alignment film 22 in an area where the rib 24 is not provided. Therefore, when the height h or the width w of the rib 24 is too large, the transmittance of the area where the rib 24 is provided may be decreased. Therefore, from the viewpoint of preventing such a decrease of the transmittance, it is preferable that the height h of the rib 24 is 2.0 μm or less and that the width w of the rib 24 is 15 μm or less.

In this embodiment, four ribs 24 are provided in each pixel so as to correspond to all of the four edge portions EG1 through EG2 where a dark line would otherwise appear. The present invention is not limited to this. An effect of improving the transmittance is realized by providing at least one rib 24 in each pixel. Needless to say, from the viewpoint of realizing a sufficiently high transmittance, it is preferable to provide the ribs 24 so as to deal with all of the dark lines (i.e., four ribs 24).

Needless to say, the present invention is not limited to the multi-domain pattern of the pixel area 20 shown in FIG. 6 as an example. For example, even in the multi-domain pattern of the pixel area 10 shown in FIG. 4(c), the transmittance can be improved by providing a rib 24, as shown in FIG. 18, in each of areas corresponding to the edge portions EG1 through EG4 where a dark line would otherwise appear.

In the structure shown in FIG. 6, the edge portions EG1 and EG3 are generally parallel to the horizontal direction, and the edge portions EG2 and EG4 are generally parallel to the vertical direction. By contrast, in the structure shown in FIG. 18, the edge portions EG1 and EG3 are generally parallel to the vertical direction, and the edge portions EG2 and EG4 are generally parallel to the horizontal direction. Accordingly, preferable positions of the first rib and the third rib (ribs corresponding to the edge portions EG1 and EG3) 24 in the structure shown in FIG. 18 are substantially the same as the preferable positions of the second rib and the fourth rib (ribs corresponding to the edge portions EG2 and EG4) 24 in the structure shown in FIG. 6. Preferable positions of the second rib and the fourth rib (ribs corresponding to the edge portions EG2 and EG4) 24 in the structure shown in FIG. 18 are substantially the same as the preferable positions of the first rib and the third rib (ribs corresponding to the edge portions EG1 and EG3) 24 in the structure shown in FIG. 6.

Figure 18:
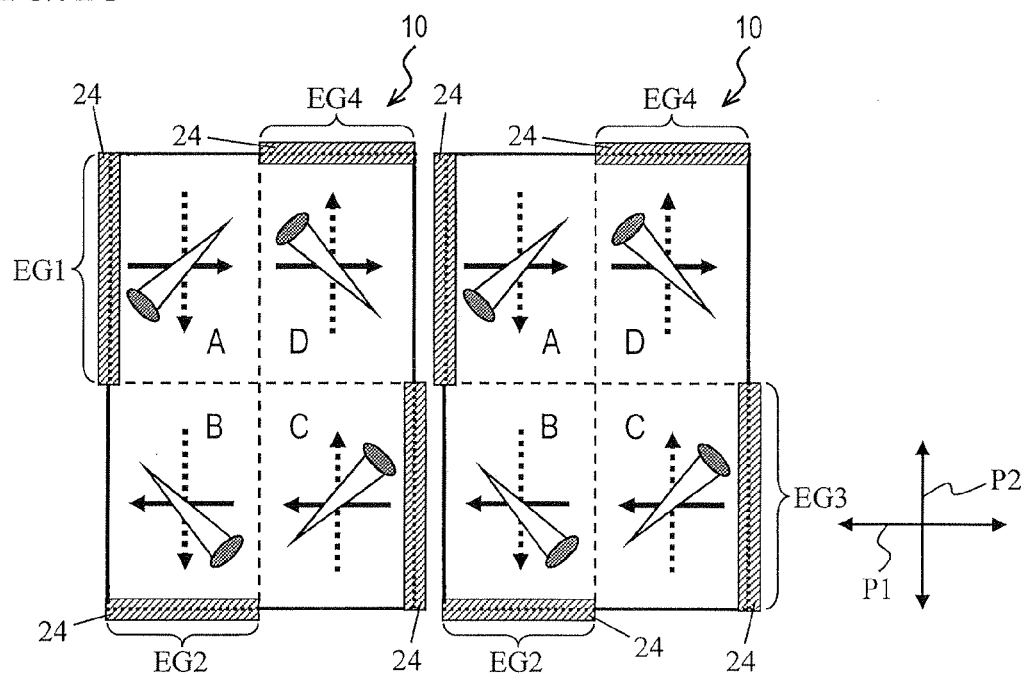
FIG. 18 is a plan view schematically showing two pixel areas of a liquid crystal display device in a preferable embodiment according to the present invention.

Accordingly, in the structure shown in FIG. 18, it is preferable that the shift S1 (μm) of the ridgeline of the first rib 24 from the edge portion EG1, the shift S2 (μm) of the ridgeline of the second rib 24 from the edge portion EG2, the shift S3 (μm) of the ridgeline of the third rib 24 from the edge portion EG3, and the shift S4 (μm) of the ridgeline of the fourth rib 24 from the edge portion EG4 fulfill the relationships of $0 \leq S1 \leq 4.9$, $-3.7 \leq S2 \leq 1.8$, $0 \leq S3 \leq 4.9$, and $-3.7 \leq S4 \leq 1.8$. Like in the structure shown in FIG. 6, it is most preferable that the first rib, the second rib, the third rib and the fourth rib are located such that the ridgelines thereof substantially overlap the corresponding edge portions.

The present invention is not limited to a multi-domain pattern by which a dark line appears in all of the four liquid crystal domains A through D. Hereinafter, other examples of multi-domain pattern will be described.

For example, by bringing together the TFT substrate and the CF substrate alignment-processed as shown in FIGS. 19(a) and (b), a pixel area 30 divided to have domains as shown in FIG. 19(c) can be formed. Like the pixel area 10, the pixel area 30 includes four liquid crystal domains A through D. The tilt directions of the liquid crystal domains A through D are the same as those of the liquid crystal domains A through D in the pixel area 10.

It should be noted that in the pixel area 30, the liquid crystal domains A through D are located in the order of top right, bottom right, bottom left and top left (i.e., clockwise from top right). A reason for this is that the pretilt directions of the left area and the right area on the TFT substrate side are opposite between the pixel area 10 and the pixel area 30.

In the pixel area 30, no dark line appears in the liquid crystal domains A and C. A reason for this is that any of the edges of the pixel electrode close to the liquid crystal domains A and C does not have such an edge portion that the azimuthal angle direction perpendicular to the edge portion and directed to the inside of the pixel electrode has an angle exceeding 90° with respect to the corresponding tilt direction. By contrast, the dark lines DL2 and DL4 appear in the liquid crystal domains B and D. A reason for this is that each of the edges of the pixel electrode close to the liquid crystal domains B and D has such an edge portion that the azimuthal angle direction perpendicular to the edge portion and directed to the inside of the pixel electrode has an angle exceeding 90° with respect to the corresponding tilt direction. The dark lines DL2 and DL4 respectively include portions DL2(H) and DL4(H) parallel to the horizontal direction and portions DL2(V) and DL4(V) parallel to the vertical direction. A reason for this is that the tilt direction of each of the liquid crystal domains B and D has an angle exceeding 90° with respect to both of an azimuthal angle direction perpendicular to the horizontal edge and directed to the inside of the pixel electrode and an azimuthal angle direction perpendicular to the vertical edge and directed to the inside of the pixel electrode.

Figure 20:
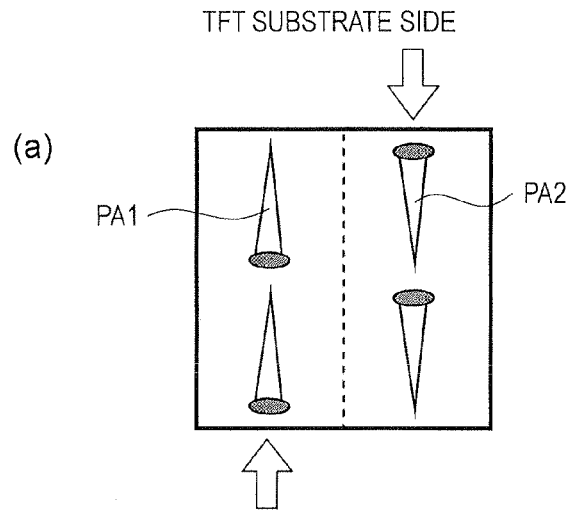
FIG. 20 shows still another example of method for dividing the pixel area.
Figure 20:
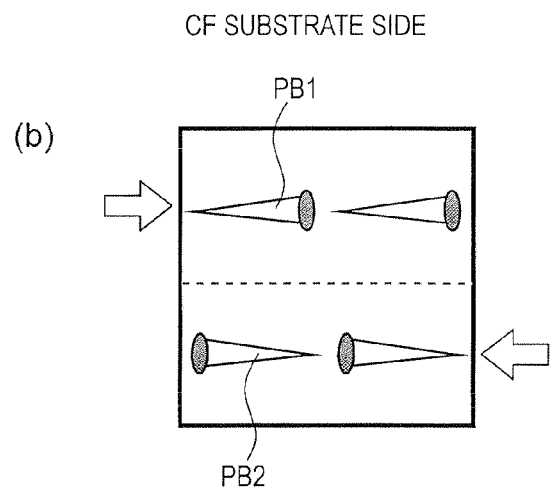
Figure 20:
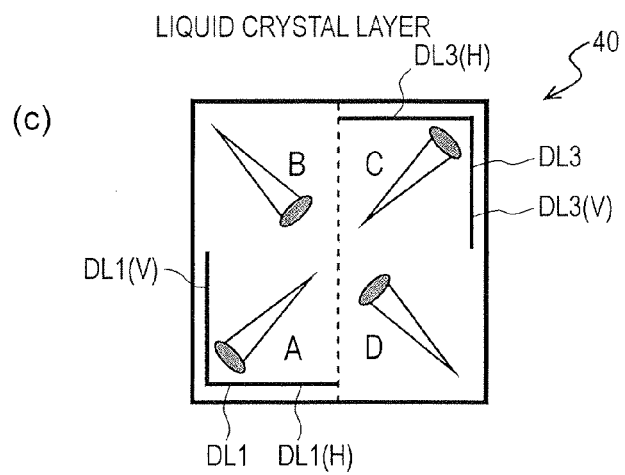

By bringing together the TFT substrate and the CF substrate alignment-processed as shown in FIGS. 20(*a*) and (*b*), a pixel area 40 divided to have domains as shown in FIG. 20(*c*) can be formed. Like the pixel area 10, the pixel area 40 includes four liquid crystal domains A through D. The tilt directions of the liquid crystal domains A through D are the same as those of the liquid crystal domains A through D in the pixel area 10.

It should be noted that in the pixel area 40, the liquid crystal domains A through D are located in the order of bottom left, top left, top right and bottom right (i.e., clockwise from bottom left). A reason for this is that the pretilt directions of the top area and the bottom area on the CF substrate side are opposite between the pixel area 10 and the pixel area 40.

In the pixel area 40, no dark line appears in the liquid crystal domains B and D. A reason for this is that any of the edges of the pixel electrode close to the liquid crystal domains B and D does not have such an edge portion that the azimuthal angle direction perpendicular to the edge portion and directed to the inside of the pixel electrode has an angle exceeding 90° with respect to the corresponding tilt direction. By contrast, the dark lines DL1 and DL3 appear in the liquid crystal domains A and C. A reason for this is that each of the edges of the pixel electrode close to the liquid crystal domains A and C has such an edge portion that the azimuthal angle direction perpendicular to the edge portion and directed to the inside of the pixel electrode has an angle exceeding 90° with respect to the corresponding tilt direction. The dark lines DL1 and DL3 respectively include portions DL1(H) and DL3(H) parallel to the horizontal direction and portions DL1(V) and DL3(V) parallel to the vertical direction. A reason for this is that the tilt direction of each of the liquid crystal domains A and C has an angle exceeding 90° with respect to both of an azimuthal angle direction perpendicular to the horizontal edge and directed to the inside of the pixel electrode and an azimuthal angle direction perpendicular to the vertical edge and directed to the inside of the pixel electrode.

Figure 19:
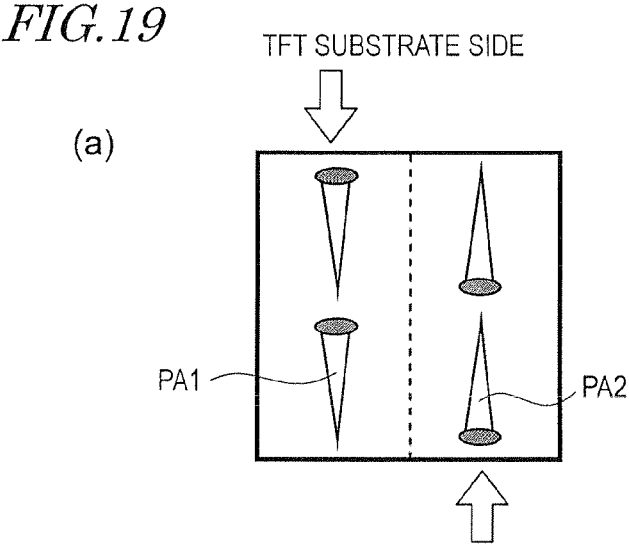
FIG. 19 shows still another example of method for dividing the pixel area.
Figure 19:
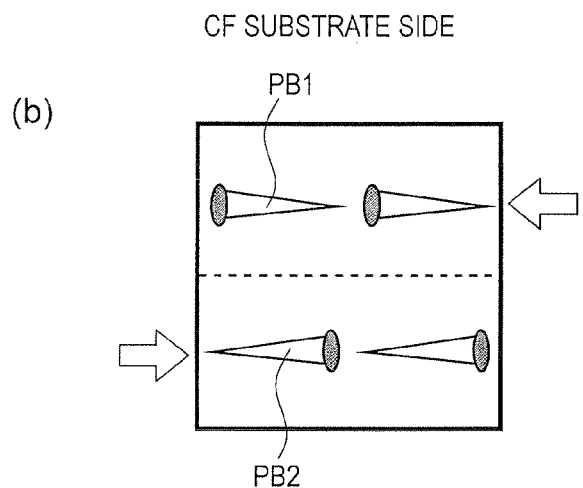
Figure 19:
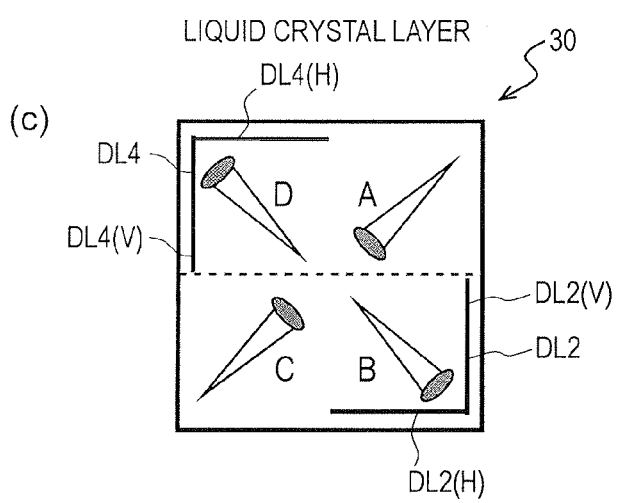
Figure 21:
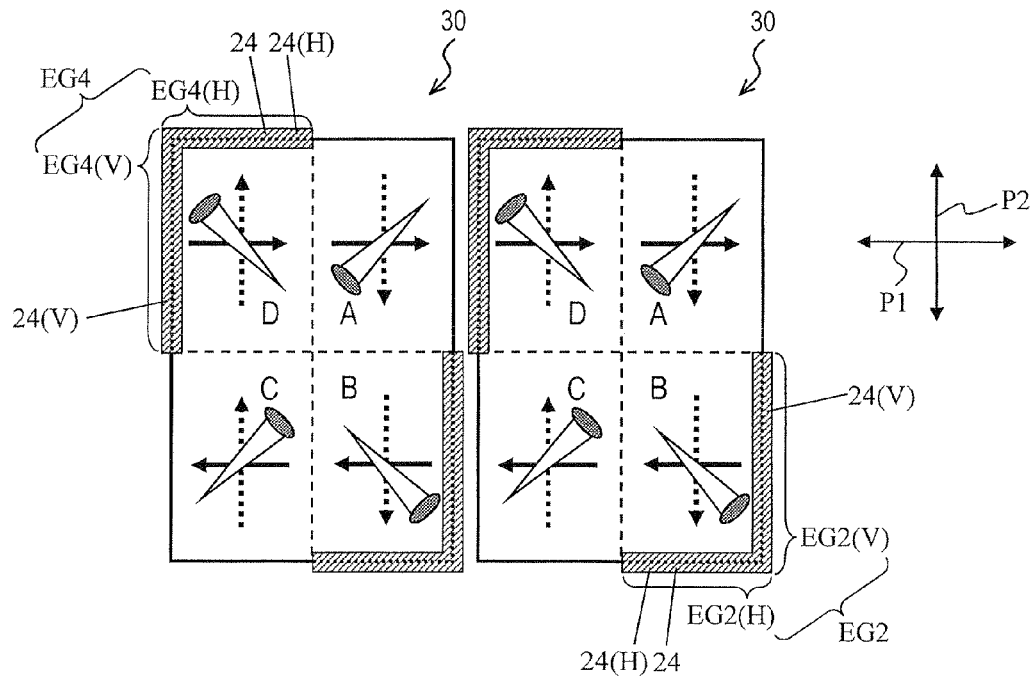
FIG. 21 is a plan view schematically showing two pixel areas of a liquid crystal display device in a preferable embodiment according to the present invention.

Even in the multi-domain pattern of the pixel area 30 shown in FIG. 19(*c*), the transmittance can be improved by providing a rib 24, as shown in FIG. 21, in each of areas corresponding to the edge portions EG2 and EG4 where a dark line would otherwise appear. In the pixel area 30, the edge portions EG2 and EG4 where a dark line would otherwise appear respectively include portions EG2(H) and EG4(H) parallel to the horizontal direction and portions EG2(V) and EG4(V) parallel to the vertical direction. Therefore, the rib 24 corresponding to the edge portion EG2 and the rib 24 corresponding to the edge portion EG4 each include a portion 24(H) generally parallel to the horizontal direction and a portion 24(V) generally parallel to the vertical direction. The portion 24(H) generally parallel to the horizontal direction and the portion 24(V) generally parallel to the vertical direction do not need to be physically continuous to each other.

Figure 22:
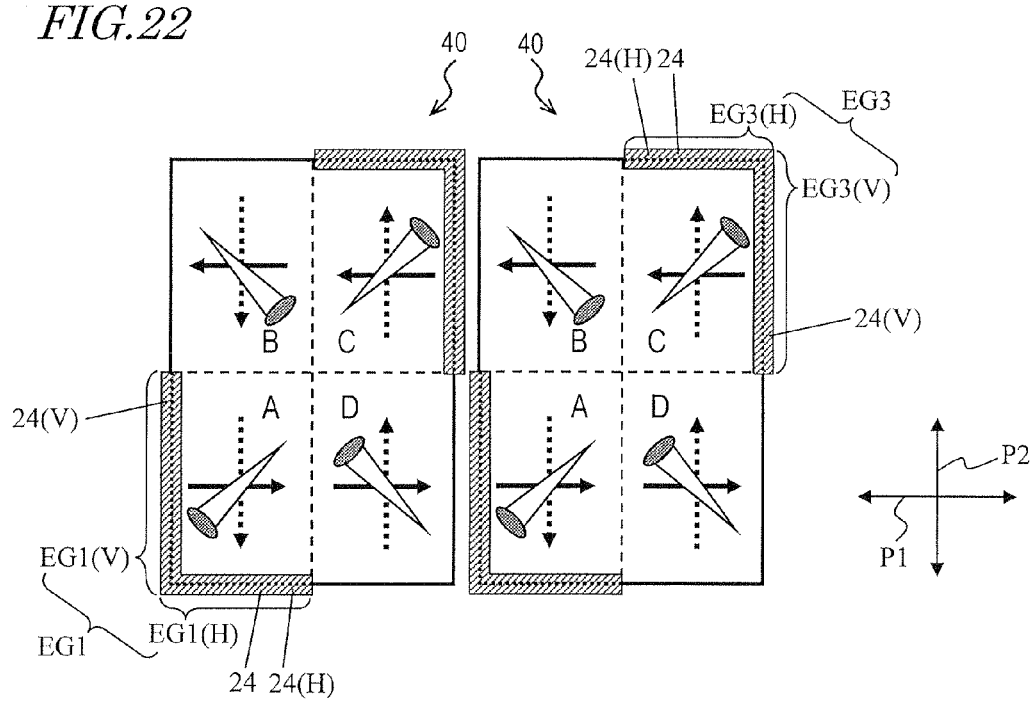
FIG. 22 is a plan view schematically showing two pixel areas of a liquid crystal display device in a preferable embodiment according to the present invention.

Even in the multi-domain pattern of the pixel area 40 shown in FIG. 20(*c*), the transmittance can be improved by providing a rib 24, as shown in FIG. 22, in each of areas corresponding to the edge portions EG1 and EG3 where a dark line would otherwise appear. In the pixel area 40, the edge portions EG1 and EG3 where a dark line would otherwise appear respectively include portions EG1(H) and EG3(H) parallel to the horizontal direction and portions EG1(V) and EG3(V) parallel to the vertical direction. Therefore, the rib 24 corresponding to the edge portion EG1 and the rib 24 corresponding to the edge portion EG3 each include a portion 24(H) generally parallel to the horizontal direction and a portion 24(V) generally parallel to the vertical direction. The portion 24(H) generally parallel to the horizontal direction and the portion 24(V) generally parallel to the vertical direction do not need to be physically continuous to each other.

The present invention is not limited to a multi-domain pattern by which four liquid crystal domains A through D are located in a matrix of 2 rows×2 columns. For example, in a pixel area 50 shown in FIG. 23, four liquid crystal domains are located in 4 rows×1 column. The tilt directions of the liquid crystal domains A through D are the same as those of the liquid crystal domains A through D of the pixel area 10 shown in FIG. 1. In the liquid crystal domains A through D of the pixel area 50, dark lines DL1 through DL4 respectively appear. The dark lines DL1 through DL4 are all parallel to the vertical direction.

Figure 23:
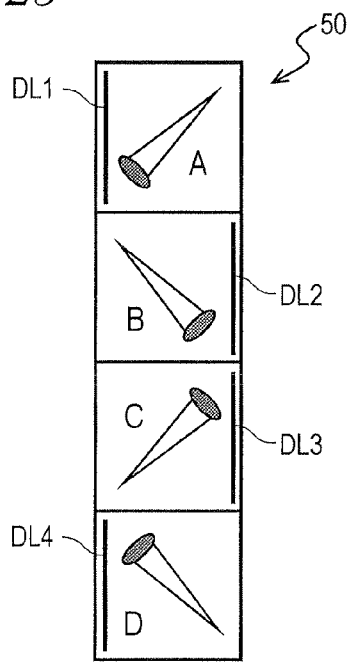
FIG. 23 shows still another example of method for dividing the pixel area, and shows the tilt directions and dark lines when a voltage is applied to the liquid crystal layer.
Figure 24:
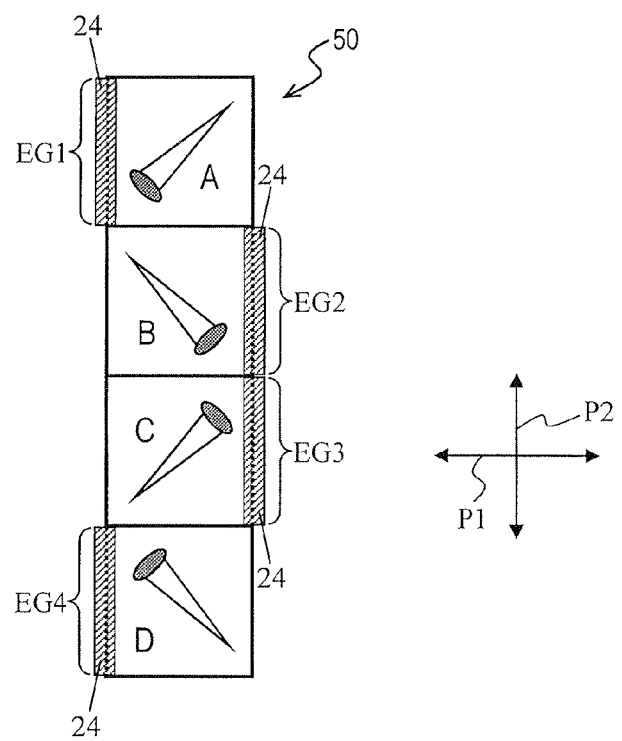
FIG. 24 is a plan view schematically showing one pixel area of a liquid crystal display device in a preferable embodiment according to the present invention.

Even in the multi-domain pattern of the pixel area shown in FIG. 23, the transmittance can be improved by providing a rib 24, as shown in FIG. 24, in each of areas corresponding to the edge portions EG1 through EG4 where a dark line would otherwise appear.

INDUSTRIAL APPLICABILITY

A liquid crystal display device according to the present invention is preferably usable for applications in which high quality display is demanded such as TV receivers and the like.

REFERENCE SIGNS LIST

1 TFT substrate (active matrix substrate)
1*a*, 2*a* Transparent plate
2 CF substrate (counter substrate)
3 Liquid crystal layer
10, 20, 30, 40, 50 Pixel area
11 Pixel electrode
12 First alignment film
13, 23 Polarizing plate
21 Counter electrode
22 Second alignment film
24 Rib
24*a*, 24*b* Side face of the rib
24*c* Apex surface of the rib
100 Liquid crystal display device
SD1 through SD4 Edge of the pixel electrode
EG1 through EG4 Edge portion of the pixel electrode
A through D Liquid crystal domain
LC Liquid crystal molecule
t1 though t4 Tilt direction (reference alignment direction)
e1 through e4 Azimuthal angle direction perpendicular to the edge of the pixel electrode and directed to the inside of the pixel electrode
DL1 through DL4 Dark line

The invention claimed is:

1. A liquid crystal display device, comprising:
a vertical alignment type liquid crystal layer;
a first substrate and a second substrate facing each other with the liquid crystal layer interposed therebetween;
a first electrode provided in the first substrate on the liquid crystal layer side and a second electrode provided in the second substrate on the liquid crystal layer side; and
a first alignment film provided between the first electrode and the liquid crystal layer and a second alignment film provided between the second electrode and the liquid crystal layer;
wherein:
the liquid crystal display device includes a plurality of pixel areas located in a matrix;
each of the plurality of pixel areas includes a first liquid crystal domain in which a tilt direction of liquid crystal molecules at the center and in the vicinity thereof in a layer plane and in a thickness direction of the liquid crystal layer when a voltage is applied between the first electrode and the second electrode is a predetermined first direction, a second liquid crystal domain in which such a tilt direction is a predetermined second direction, a third liquid crystal domain in which such a tilt direction is a predetermined third direction and a fourth liquid crystal domain in which such a tilt direction is a predetermined fourth direction; a difference between any two among the first direction, the second direction, the third direction and the fourth direction is approximately equal to an integral multiple of 90°;
the first liquid crystal domain is close to at least a part of edges of the first electrode, and the at least a part includes a first edge portion, wherein an azimuthal angle direction perpendicular to the first edge portion and directed to the inside of the first electrode has an angle exceeding 90° with respect to the first direction;
the second substrate includes a first rib provided in an area corresponding to the first edge portion;
the second liquid crystal domain is close to at least a part of the edges of the first electrode, and the at least a part includes a second edge portion, wherein an azimuthal angle direction perpendicular to the second edge portion and directed to the inside of the first electrode has an angle exceeding 90° with respect to the second direction;
the third liquid crystal domain is close to at least a part of the edges of the first electrode, and the at least a part includes a third edge portion, wherein an azimuthal angle direction perpendicular to the third edge portion and directed to the inside of the first electrode has an angle exceeding 90° with respect to the third direction;
the fourth liquid crystal domain is close to at least a part of the edges of the first electrode, and the at least a part includes a fourth edge portion, wherein an azimuthal angle, direction perpendicular to the fourth edge portion and directed to the inside of the first electrode has an angle exceeding 90° with respect to the fourth direction;
the second substrate includes a second rib provided in an area corresponding to the second edge portion, a third rib provided in an area corresponding to the third edge portion, and a fourth rib provided in an area corresponding to the fourth edge portion; and
wherein as seen from a frontal direction, the first rib is located such that the center thereof in a width direction substantially overlaps the first edge portion, the second rib is located such that the center thereof in the width direction substantially overlaps the second edge portion, the third rib is located such that the center thereof in the width direction substantially overlaps the third edge portion, and the fourth rib is located such that the center thereof in the width direction substantially overlaps the fourth edge portion.

2. The liquid crystal display device of claim 1, wherein:
where an azimuthal angle of a horizontal direction of a display plane is 0°, the first direction is a direction of about 225°, the second direction is a direction of about 315°, the third direction is a direction of about 45°, and the fourth direction is a direction of about 135°; and
the first edge portion and the third edge portion are generally parallel to a vertical direction of the display plane, and the second edge portion and the fourth edge portion are generally parallel to the horizontal direction of the display plane.

3. The liquid crystal display device of claim 2, wherein:
the first substrate includes a gate bus line extending generally parallel to the horizontal direction of the display plane, and a source bus line extending generally parallel to the vertical direction of the display plane; and
as seen from a frontal direction, a shift S1 (μm) of the center of the first rib in a width direction from the first edge portion, a shift S2 (μm) of the center of the second rib in the width direction from the second edge portion, a shift S3 (μm) of the center of the third rib in the width direction from the third edge portion, and a shift S4 (μm) of the center of the fourth rib in the width direction from the fourth edge portion fulfill the relationships of 0≤S1≤4.9, −3.7≤S2≤1.8, 0≤S3≤4.9, and −3.7≤S4≤1.8, where the inner side to the edges of the first electrode is represented by a positive numerical value and the outer side to the edges of the first electrode is represented by a negative numerical value.

4. The liquid crystal display device of claim 1, wherein:
where an azimuthal angle of a horizontal direction of a display plane is 0°, the first direction is a direction of about 225°, the second direction is a direction of about 315°, the third direction is a direction of about 45°, and the fourth direction is a direction of about 135°; and
the first edge portion and the third edge portion are generally parallel to the horizontal direction of the display plane, and the second edge portion and the fourth edge portion are generally parallel to a vertical direction of the display plane.

5. The liquid crystal display device of claim 4, wherein:
the first substrate includes a gate bus line extending generally parallel to the horizontal direction of the display plane, and a source bus line extending generally parallel to the vertical direction of the display plane; and
as seen from a frontal direction, a shift S1 (μm) of the center of the first rib in a width direction from the first edge portion, a shift S2 (μm) of the center of the second rib in the width direction from the second edge portion, a shift S3 (μm) of the center of the third rib in the width direction from the third edge portion, and a shift S4 (μm) of the center of the fourth rib in the width direction from the fourth edge portion fulfill the relationships of −3.7≤S1≤1.8, 0≤S2≤4.9, −3.7≤S3≤1.8 and 0≤S4≤4.9, where the inner side to the edges of the first electrode is represented by a positive numerical value and the outer side to the edges of the first electrode is represented by a negative numerical value.

6. The liquid crystal display device of claim 1, wherein the first liquid crystal domain, the second liquid crystal domain, the third liquid crystal domain and the fourth liquid crystal domain are each adjacent to the others of the liquid crystal domains and are located in a matrix of 2 rows×2 columns.

7. The liquid crystal display device of claim 6, wherein the first liquid crystal domain, the second liquid crystal domain, the third liquid crystal domain and the fourth liquid crystal domain are located such that the tilt directions in adjacent liquid crystal domains among the first through fourth liquid crystal domains are different by 90° from each other.

8. The liquid crystal display device of claim 1, further comprising a pair of polarizing plates facing each other with the liquid crystal layer interposed therebetween and located such that transmission axes thereof are generally perpendicular to each other;
wherein the first direction, the second direction, the third direction and the fourth direction each make an angle of about 45° with respect to the transmission axes of the pair of polarizing plates.

9. The liquid crystal display device of 1, wherein:
the liquid crystal layer contains the liquid crystal molecules having a negative dielectric anisotropy; and
a pretilt direction defined by the first alignment film and a pretilt direction defined by the second alignment film are different by about 90° from each other.

10. The liquid crystal display device of claim 1, wherein a pretilt angle defined by the first alignment film and a pretilt angle defined by the second alignment film are approximately equal to each other.

11. The liquid crystal display device of claim 1, wherein the first alignment film and the second alignment film are each an optical alignment film.

12. The liquid crystal display device of claim 1, wherein the first rib includes an inclining first side face, an inclining second side face located outer to the first side face, and an apex surface defined between the first side face and the second side face.

13. A liquid crystal display device, comprising:
a vertical alignment type liquid crystal layer;
a first substrate and a second substrate facing each other with the liquid crystal layer interposed therebetween;
a first electrode provided in the first substrate on the liquid crystal layer side and a second electrode provided in the second substrate on the liquid crystal layer side; and
a first alignment film provided between the first electrode and the liquid crystal layer and a second alignment film provided between the second electrode and the liquid crystal layer;
wherein:
the liquid crystal display device includes a plurality of pixel areas located in a matrix;
each of the plurality of pixel areas includes a first liquid crystal domain in which a tilt direction of liquid crystal molecules at the center and in the vicinity thereof in a layer plane and in a thickness direction of the liquid crystal layer when a voltage is applied between the first electrode and the second electrode is a predetermined first direction, a second liquid crystal domain in which such a tilt direction is a predetermined second direction, a third liquid crystal domain in which such a tilt direction is a predetermined third direction and a fourth liquid crystal domain in which such a tilt direction is a predetermined fourth direction; a difference between any two among the first direction, the second direction, the third direction and the fourth direction is approximately equal to an integral multiple of 90°;
the first liquid crystal domain is close to at least a part of edges of the first electrode, and the at least a part includes a first edge portion, wherein an azimuthal angle direction perpendicular to the first edge portion and directed to the inside of the first electrode has an angle exceeding 90° with respect to the first direction;
the second substrate includes a first rib provided in an area corresponding to the first edge portion;
the second liquid crystal domain is close to at least a part of the edges of the first electrode, and the at least a part includes a second edge portion, wherein an azimuthal angle direction perpendicular to the second edge portion and directed to the inside of the first electrode has an angle exceeding 90° with respect to the second direction;
the third liquid crystal domain is close to at least a part of the edges of the first electrode, and the at least a part includes a third edge portion, wherein an azimuthal angle direction perpendicular to the third edge portion and directed to the inside of the first electrode has an angle exceeding 90° with respect to the third direction;
the fourth liquid crystal domain is close to at least a part of the edges of the first electrode, and the at least a part includes a fourth edge portion, wherein an azimuthal angle direction perpendicular to the fourth edge portion and directed to the inside of the first electrode has an angle exceeding 90° with respect to the fourth direction;
the second substrate includes a second rib provided in an area corresponding to the second edge portion, a third rib provided in an area corresponding to the third edge portion, and a fourth rib provided in an area corresponding to the fourth edge portion;
where an azimuthal angle of a horizontal direction of a display plane is 0°, the first direction is a direction of about 225°, the second direction is a direction of about 315°, the third direction is a direction of about 45°, and the fourth direction is a direction of about 135°;
the first edge portion and the third edge portion are generally parallel to a vertical direction of the display plane, and the second edge portion and the fourth edge portion are generally parallel to the horizontal direction of the display plane;
the first substrate includes a gate bus line extending generally parallel to the horizontal direction of the display plane, and a source bus line extending generally parallel to the vertical direction of the display plane; and
as seen from a frontal direction, a shift S1 (μm) of the center of the first rib in a width direction from the first edge portion, a shift S2 (μm) of the center of the second rib in the width direction from the second edge portion, a shift S3 (μm) of the center of the third rib in the width direction from the third edge portion, and a shift S4 (μm) of the center of the fourth rib in the width direction from the fourth edge portion fulfill the relationships of $0 \leq S1 \leq 4.9$, $-3.7 \leq S2 \leq 1.8$, $0 \leq S3 \leq 4.9$, and $-3.7 \leq S4 \leq 1.8$, where the inner side to the edges of the first electrode is represented by a positive numerical value and the outer side to the edges of the first electrode is represented by a negative numerical value.

14. A liquid crystal display device, comprising:
a vertical alignment type liquid crystal layer;
a first substrate and a second substrate facing each other with the liquid crystal layer interposed therebetween;
a first electrode provided in the first substrate on the liquid crystal layer side and a second electrode provided in the second substrate on the liquid crystal layer side; and
a first alignment film provided between the first electrode and the liquid crystal layer and a second alignment film provided between the second electrode and the liquid crystal layer;

wherein:

the liquid crystal display device includes a plurality of pixel areas located in a matrix;

each of the plurality of pixel areas includes a first liquid crystal domain in which a tilt direction of liquid crystal molecules at the center and in the vicinity thereof in a layer plane and in a thickness direction of the liquid crystal layer when a voltage is applied between the first electrode and the second electrode is a predetermined first direction, a second liquid crystal domain in which such a tilt direction is a predetermined second direction, a third liquid crystal domain in which such a tilt direction is a predetermined third direction and a fourth liquid crystal domain in which such a tilt direction is a predetermined fourth direction; a difference between any two among the first direction, the second direction, the third direction and the fourth direction is approximately equal to an integral multiple of 90°;

the first liquid crystal domain is close to at least a part of edges of the first electrode, and the at least a part includes a first edge portion, wherein an azimuthal angle direction perpendicular to the first edge portion and directed to the inside of the first electrode has an angle exceeding 90° with respect to the first direction;

the second substrate includes a first rib provided in an area corresponding to the first edge portion;

the second liquid crystal domain is close to at least a part of the edges of the first electrode, and the at least a part includes a second edge portion, wherein an azimuthal angle direction perpendicular to the second edge portion and directed to the inside of the first electrode has an angle exceeding 90° with respect to the second direction;

the third liquid crystal domain is close to at least a part of the edges of the first electrode, and the at least a part includes a third edge portion, wherein an azimuthal angle direction perpendicular to the third edge portion and directed to the inside of the first electrode has an angle exceeding 90° with respect to the third direction;

the fourth liquid crystal domain is close to at least a part of the edges of the first electrode, and the at least a part includes a fourth edge portion, wherein an azimuthal angle direction perpendicular to the fourth edge portion and directed to the inside of the first electrode has an angle exceeding 90° with respect to the fourth direction;

the second substrate includes a second rib provided in an area corresponding to the second edge portion, a third rib provided in an area corresponding to the third edge portion, and a fourth rib provided in an area corresponding to the fourth edge portion;

where an azimuthal angle of a horizontal direction of a display plane is 0°, the first direction is a direction of about 225°, the second direction is a direction of about 315°, the third direction is a direction of about 45°, and the fourth direction is a direction of about 135°; and the first edge portion and the third edge portion are generally parallel to the horizontal direction of the display plane, and the second edge portion and the fourth edge portion are generally parallel to a vertical direction of the display plane;

the first substrate includes a gate bus line extending generally parallel to the horizontal direction of the display plane, and a source bus line extending generally parallel to the vertical direction of the display plane; and as seen from a frontal direction, a shift S1 ($\mu$m) of the center of the first rib in a width direction from the first edge portion, a shift S2 ($\mu$m) of the center of the second rib in the width direction from the second edge portion, a shift S3 ($\mu$m) of the center of the third rib in the width direction from the third edge portion, and a shift S4 ($\mu$m) of the center of the fourth rib in the width direction from the fourth edge portion fulfill the relationships of $-3.7 \leq S1 \leq 1.8$, $0 \leq S2 \leq 4.9$, $-3.7 \leq S3 \leq 1.8$ and $0 \leq S4 \leq 4.9$, where the inner side to the edges of the first electrode is represented by a positive numerical value and the outer side to the edges of the first electrode is represented by a negative numerical value.

* * * * *